United States Patent [19]
Copeland

[11] Patent Number: 5,271,907
[45] Date of Patent: Dec. 21, 1993

[54] HIGH TEMPERATURE REGENERABLE HYDROGEN SULFIDE REMOVAL AGENTS

[75] Inventor: Robert J. Copeland, Wheat Ridge, Colo.

[73] Assignee: TDA Research, Inc., Wheatridge, Colo.

[21] Appl. No.: 844,829

[22] Filed: Mar. 3, 1992

[51] Int. Cl.$^5$ .............................................. B01D 53/02
[52] U.S. Cl. .................................. 422/178; 422/177; 422/170; 422/139; 422/216
[58] Field of Search ............... 422/171, 173, 177, 146, 422/178, 139, 216; 423/230, 231, 224, 571, 577, 563; 502/39

[56] References Cited

U.S. PATENT DOCUMENTS

| | | | |
|---|---|---|---|
| 3,784,680 | 1/1974 | Strong et al. | 423/577 |
| 3,932,584 | 1/1976 | Asakusa et al. | 423/571 |
| 4,003,740 | 1/1977 | Huggins et al. | 423/571 |
| 4,324,776 | 4/1982 | Kim | 423/571 |
| 4,478,800 | 10/1984 | Van der Wal et al. | 423/230 |
| 4,499,944 | 2/1985 | Komakine | 422/146 |
| 4,504,459 | 3/1985 | Stothers | 423/230 |
| 4,690,802 | 9/1987 | Jenkinson | 422/146 |
| 4,725,408 | 2/1988 | Pratt et al. | 422/146 |
| 4,959,334 | 9/1990 | Mauleon et al. | 502/39 |

FOREIGN PATENT DOCUMENTS

WO9014876 12/1990 PCT Int'l Appl.

OTHER PUBLICATIONS

Nielsen, et al., Steam Regenerable Sulfur Absorption Masses and Their Application in IGCC Plants Oct. 1991 (All).

Primary Examiner—Robert J. Warden
Assistant Examiner—Hien Tran
Attorney, Agent, or Firm—Beaton & Swanson

[57] ABSTRACT

A system for high temperature desulfurization of coal-derived gases using regenerable sorbents. One sorbent is stannic oxide (tin oxide, $SnO_2$), the other sorbent is a metal oxide or mixed metal oxide such as zinc ferrite ($ZnFe_2O_4$). Certain otherwise undesirable by-products, including hydrogen sulfide ($H_2S$) and sulfur dioxide ($SO_2$) are reused by the system, and elemental sulfur is produced in the regeneration reaction. A system for refabricating the sorbent pellets is also described.

10 Claims, 5 Drawing Sheets

HIGH TEMPERATURE REGENERABLE HYDROGEN SULFIDE REMOVAL AGENTS

FIELD OF THE INVENTION

This invention relates to high temperature hydrogen sulfide removal from coal-derived fuel gases, and more particularly to the use of regenerable sorbent agents for absorbing hydrogen sulfide while recovering elemental sulfur. A system for re-fabricating the sorbent pellets is also disclosed. The invention has particular utility for the removal of sulfur contaminants from the gaseous product of coal fueled power plants and coal synthetic fuels plants.

BACKGROUND OF THE INVENTION

The development of an advanced clean-coal technology will permit the use of coal to replace oil and gas while eliminating the environmental penalty now associated with sulfur-containing coal. One way of producing fuel and power from coal is by way of pulverized coal combustion. Another, more efficient, way of doing so is by gasification of coal. Coal gasification produces a gas stream suitable for the production of electrical power, gaseous and liquid fuels, or other products. Before this can happen on a large scale, a low-cost, clean coal gas must be produced.

Coal gasification plants carry the promise of highly efficient utilization of coal. Electrical energy, for example, can be generated by the partial oxidation of coal in a gasifier/molten carbonate fuel cell system (MCFC) or in an integrated gasification combined cycle (IGCC) plant. An IGCC plant generates power by the direct contact of hot coal-derived gases with turbine blades, and is one of the most promising new technologies for the production of base-load electric power from coal.

While coal is the most abundant energy resource in the United States, and IGCC and MCFC plants have good generating efficiencies, current coal-based power generation imposes greater environmental burdens than oil or natural gas. Coal-derived gases contain particulates, tars, ammonia, alkali metals and sulfur. These materials are not only pollutants, but can cause corrosion, erosion or deposition on the turbine blades of a power plant.

Coal-derived gases contain significant levels of sulfur contamination. When coal is gasified, most of the total sulfur content is converted to hydrogen sulfide ($H_2S$). The hydrogen sulfide concentration in the coal gas depends on the amount of sulfur initially present in the coal and on the nature of the coal gasification process used. Gas-phase concentrations of hydrogen sulfide in the order of several thousand parts per million (ppm) are typical, and 10,000 to 30,000 ppm is not unusual. Sulfur contamination of the coal gas is an environmental problem and also an operational problem. Because sulfur is a useful chemical, its recovery is also worthwhile economically.

If not removed from the hot gasifier coal, the hydrogen sulfide would attack turbine blades in an IGCC plant, electrodes in fuel cells, and catalyst in synthetic fuels production.

In the environment, the un-removed sulfur species present in coal gases can react with oxygen and atmospheric water vapor to produce sulfuric acid and can contribute to the problems of "acid rain." The United States Environmental Protection Agency standards of Oct. 1, 1985 (40 C.F.R. Part 60, Subpart LLL) limit natural gas processing plants and petroleum refineries to sulfur emissions in the order of less than 90 parts per million (ppm), requiring sulfur removal in the range of 99% efficiency.

The European Community will require a minimum of 98.5% sulfur recovery rates by 1992, and the Federal Republic of Germany's regulations currently require up to 99.5% recovery. The United States New Source Performance Standards require at least 90% removal of sulfur for most new plants. IGCC plants, however, have the promise of greater than 90% removal of sulfur, and would largely eliminate the environmental penalties of coal use.

Economically, sulfur is valuable as a constituent of sulfuric acid, the largest single chemical consumed in the United States (over 11 million long tons of sulfur consumed in 1988). In the United States, elemental sulfur is typically recovered by steam injection from underground deposits, but this is thermally inefficient. Natural gas and petroleum processing is another large source, but these show signs of decline in the United States. Accordingly, if elemental sulfur were to be recovered as a by-product of the desulfurization of coal gas, the recovered sulfur would have a ready market.

To recover sulfur from the coal gas stream and to minimize the emission of sulfur compounds, an IGCC plant typically operates with a reaction step and a separate sulfur removal step. During the reaction step, coal is converted to product gas (synthesis gas, or "syngas") at high temperature. During the sulfur removal step, physical solvents are generally used to remove sulfur products and other contaminants from the crude syngas.

In a typical, "cold gas" sulfur removal process, the removal step reaction cannot take place at the high temperatures encountered in the reaction step. Thus, a cold gas approach requires (a) cooling of the hot (500°-800° C.) syngas to the relatively lower temperatures commonly needed for physical solvents, and (b) subsequent reheating of the cleaned syngas prior to its introduction into the gas turbine. These cooling and heating phases tend to increase capital costs and operating costs.

An IGCC plant has the potential for higher conversion efficiency, lower capital costs, and lower pollution impacts than pulverized coal-fired combustion even when used with cold gas cleanup systems. For economically more viable conversion of coal to gas without significant loss of thermal energy, there is a need for a "hot gas" cleanup system, capable of removing sulfur from the coal gas stream at high temperatures, in the range of 500°-800° C.

The use of hot gas cleanup can reduce capital costs and improve overall conversion cycle efficiency by eliminating the need to cool and reheat the gasifier outlet gases. It can also reduce wastewater disposal costs. Other coal gasification technologies besides IGCC and MCFC applications which would significantly benefit from hot gas cleanup include gasifier/diesel engine combinations, and processes for producing synthetic fuels from coal.

Many commercial processes are available for cold gas cleanup, but advanced hot gas cleanup systems are just now being tested at the pilot scale. Over the past decade, the United States Department of Energy and its Morgantown Energy Technology Center have made extensive efforts to develop high temperature regenerable desulfuring agents. Successful sorbents should absorb sulfur so as to provide efficient desulfurization, and should be long-lived or regenerable.

Current hot gas sulfur removal research is focused on regenerable, metal oxide sorbents that remove sulfur from the coal gas, and are then regenerated with air. Some of the metal oxides which have been tried include zinc ferrite, copper zinc oxide, and cuprous oxide.

The most developed candidate is zinc ferrite ($ZnFe_2O_4$), which reacts as follows with the hydrogen sulfide ($H_2S$) contaminant of coal-derived gases to form zinc and iron sulfides ($ZnS$ and $FeS$):

$$AnFe_2O_4 + 3H_2S + H_2 \rightarrow ZnS + 2FeS + 4H_2O.$$

The zinc and iron sulfide products of the absorption of hydrogen sulfide, when reacted with air, will regenerate the zinc ferrite starting material producing a sulfur dioxide ($SO_2$) byproduct:

$$ZnS + 2 FeS + 5 O_2 \rightarrow ZnFe_2O_4 + 3 SO_2$$

As can be seen, the regeneration process produces sulfur dioxide, which is a contaminant which must then be disposed of itself. The standard recovery method is to react the sulfur dioxide with limestone, producing ash. This process incurs significant costs for the purchase of limestone (ranging from $7.00 to $30.00 per ton) and for the disposal of the ash (ranging from $4.50 to $15.00 per ton). Disposal costs may be expected to rise as the number of available landfill sites is reduced. Another type of sulfur dioxide recovery method (known as the Direct Sulfur Recovery Processes or DSRP) reacts the sulfur dioxide with carbon monoxide (CO) and hydrogen gas ($H_2$) in a sidestream of hot coal gases to produce water and elemental sulfur. The DSRP method incurs costs because the use of the coal gases as a reducing agent decreases the overall energy available from the gasifier by about 4%.

Current hot gas cleanup technology, involving regenerable zinc ferrite ($ZnFe_2O_4$) and follow-on removal of the sulfur dioxide by-product with limestone or DSRP methods can cost approximately $425.00 per ton of sulfur. This amounts to about 5.7 mills per kilowatt hour, or as much as 9% of the busbar (ideal rated capacity) electrical cost of an IGCC. Clearly, an improved method of hot gas recovery could significantly reduce the cost of the electricity from an IGCC.

Full realization of the tremendous commercial potential of coal gas fueled power plants and related technologies awaits the development of an inexpensive and reliable hot gas clean up method for the removal of sulfur contaminants from the coal derived gas stream.

The successful sorbent must, therefore, be able to remove sulfur so as to leave sulfur levels in the gas stream of 20 ppm or less (a recovery rate greater than 99.8%); and it must also have physical and chemical stability in gas atmospheres of 500° C. and above. A sorbent pellet will be reused in successive absorption cycles. Accordingly, and for the sake of economic efficiency, the pellet must be long-lived or, if short-lived, must be easily refabricated.

In addition to its chemical characteristics, the sorbent's physical characteristics affect its suitability for use in high temperature desulfurization. Among the relevant characteristics are durability, temperature stability, life span, and rate of utilization. Sorbent pellets are subject to physical and chemical degradation over successive process cycles; they may be broken by mechanical transport, fractured by multiple chemical reactions, and contaminated by gasifier ash which is not removed by upstream filtering.

Although zinc ferrite, and other metal oxides and mixed metal oxides have had some success in high temperature desulfurization of coal gases, they have limitations.

Thus, it can be seen that there is a need for an efficient high temperature desulfurization process that will remove as much as 99.8% of the hydrogen sulfide contaminants of the coal gasification stream. The desired process would use regenerable sorbents. The desired process would also consume unwanted by-products of the absorption/regeneration reactions so as to minimize the need for separate recovery and disposal of such by-products. The desired process would recover elemental sulfur in a useable form for resale.

Because the desired process would subject the sorbent pellets used in the system to conditions of heat, chemical reaction and pulverizing forces which tend to degrade the pellets, there is an additional need for a suitable pellet. If a long-lived pellet is not commercially feasible, the desired pellet must be one which is short-lived. The desired short-lived pellet must be capable of being refabricated. Accordingly, a method for the inexpensive recovery and reuse of the tin (or other metal species) from the degraded sorbent pellets is desirable. The desired method would involve the periodic removal of degraded pellets, the chemical recovery of the metal species from the degraded pellet, and the refabrication of the high surface area tin oxide (or other metal oxide) in a new pellet.

SUMMARY OF THE INVENTION

This invention includes a regenerable sorbent system which removes sulfur contaminants from hot coal gasifier-derived gases to the level of 20 parts per million or less on the absorption side of the process. On the regeneration side of the process, the sorbents are regenerated together with elemental sulfur, which can be recovered and resold. The regeneration process includes two stages, with the otherwise undesirable sulfur dioxide ($SO_2$) by-product of the first stage regeneration reaction being consumed in the second stage regeneration reaction.

To produce this absorption/regeneration cycle, the system of this invention uses two sorbents, one of which is stannic oxide (tin oxide, $SnO_2$), and the other of which is an air regenerated metal oxide, such as zinc ferrite ($ZnFe_2O_4$), producing $SO_2$ during its regeneration.

A unique chemical feature of this system is that, after the stannic oxide and zinc ferrite absorb the sulfur contaminants from the hot gas stream, the two sorbents can be regenerated in two stages. In the first stage regeneration reaction, the zinc ferrite is regenerated, forming a sulfur dioxide ($SO_2$) by-product. In the second stage regeneration reaction, the tin oxide is regenerated. Because sulfur dioxide is one of the required species for the regeneration of the tin oxide, this otherwise undesirable species is consumed as part of the reaction, producing the regenerated tin oxide and elemental sulfur which can be reclaimed and resold.

The large quantities of sulfur produced as a by-product can generate additional revenue. It has been estimated that over 1700 IGCC plants with a capacity of 100 MW each would be required to produce enough sulfur to meet the United States demand for sulfuric acid (the primary use of sulfur). Thus, the additional sulfur production would not saturate the market, and significant revenues could be generated even with large numbers of IGCC plants. In addition, the elimination of the use of limestone in the sulfur dioxide recovery stage of existing hot gas desulfurization processes, such as those exclusively utilizing zinc ferrite, eliminates the cost of purchase of limestone and the follow on cost for disposing of the sulfided limestone end product.

These reactions occur at the operating temperatures expected in hot gas cleanup, and can remove the hydrogen sulfide ($H_2S$) contaminant at about a 99.8% recovery rate, reducing the concentration of hydrogen sulfide in hot coal gases from 10,000–30,000 ppm down to 20 ppm or less. The system may be adopted to fixed-bed configuration plants (where the sorbents are fashioned into pellets and disposed into beds, and the gases are introduced to the beds) or in moving-bed or fluidized bed configuration plants (where the sorbent pellets are moving through the gas stream). Because of the natural stratification of the reaction, it is acceptable for the two sorbent pellets, the stannic oxide and the zinc ferrite, to be mixed together.

In addition to providing hot gas desulfurization using a regenerable sorbent system which consumes the sulfur dioxide by-product and produces recoverable elemental sulfur, the system of this invention also provides for the refabrication of the sorbent pellets. It has been observed that the sulfur absorption reaction proceeds at a much better rate where the stannic oxide sorbent has a high surface area. During multiple absorption/regeneration cycles, the stannic oxide pellets are degraded, and surface area is lost.

One way to solve this problem is to devise a long-lived sorbent pellet, in which the sorbent is impregnated on a catalyst support having high inherent strength so as to last for a large number of cycles (in the range of 300 or more). This tends to be an expensive proposition. Another way to solve the problem is to accept a pellet which is short-lived (having about 20 cycles of effective life), but to devise a method for periodically refabricating the pellets.

What is needed for a short-lived pellet to be effective is a method for the inexpensive recovery and reuse of the tin from degraded stannic oxide (degradation occurs because of loss of surface area by sintering; loss of physical integrity by crushing to a fine powder that could be lost in the gas stream; and contamination by ash or chloride ion in the gas stream). Because of degradation, a periodic replacement of part of the sorbent inventory is required The system of this invention also includes a method for recovering and reusing the tin from the degraded stannic oxide. A small portion (about 10% per cycle) of the stannic oxide pellets is removed periodically from the absorption/regeneration chambers.

The refabrication system operates in two versions. In one version, it is the sulfide pellet (for example, the stannous sulfide product of the absorption reaction) which is removed from the absorption/regeneration chambers. In another version, it is the oxide pellet (for example, the stannic oxide product of the regeneration reaction) which is removed from the absorption/regeneration chambers. The removed sulfide pellets are dissolved in an acid, such as sulfuric acid ($H_2SO_4$); the removed oxide pellets are dissolved in a base, such as sodium hydroxide (NaOH).

By either route, a very high surface area stannic oxide ($SnO_2$) sorbent, which is the desired refabricated product, is produced and other by-products are reused in the system. The refabrication system works equally well with the second sorbent used in the desulfurization process (that is, the zinc ferrite or other metal oxide used), because the metal oxides/sulfides will react as does the stannous sulfide in solution with the corresponding acid.

It is a specific object of this invention to provide an efficient high temperature desulfurization process that will remove as much as 99.8% of the hydrogen sulfide contaminants of the coal gasification stream. The system of this invention uses regenerable sorbents. The system of this invention also consumes unwanted by-products of the absorption/regeneration reactions so as to minimize the need for separate recovery and disposal of such by-products. The system of this invention also recovers elemental sulfur in a useable form for resale.

It is another specific object of this invention to provide a process for refabricating a short-lived pellet suitable for use in the system of this invention. Accordingly, this invention includes a method for the inexpensive recovery and reuse of the tin (or other metal species) from the degraded sorbent pellets used in the system of this invention. The refabrication method of this invention involves the periodic removal of degraded pellets, the chemical recovery of the metal species from the degraded pellet, and the refabrication of the high surface area tin oxide (or other metal oxide) in a new pellet.

These, and other, advantages of this invention will become more apparent in the following discussion.

DETAILED DESCRIPTION OF THE INVENTION

Figure 1:
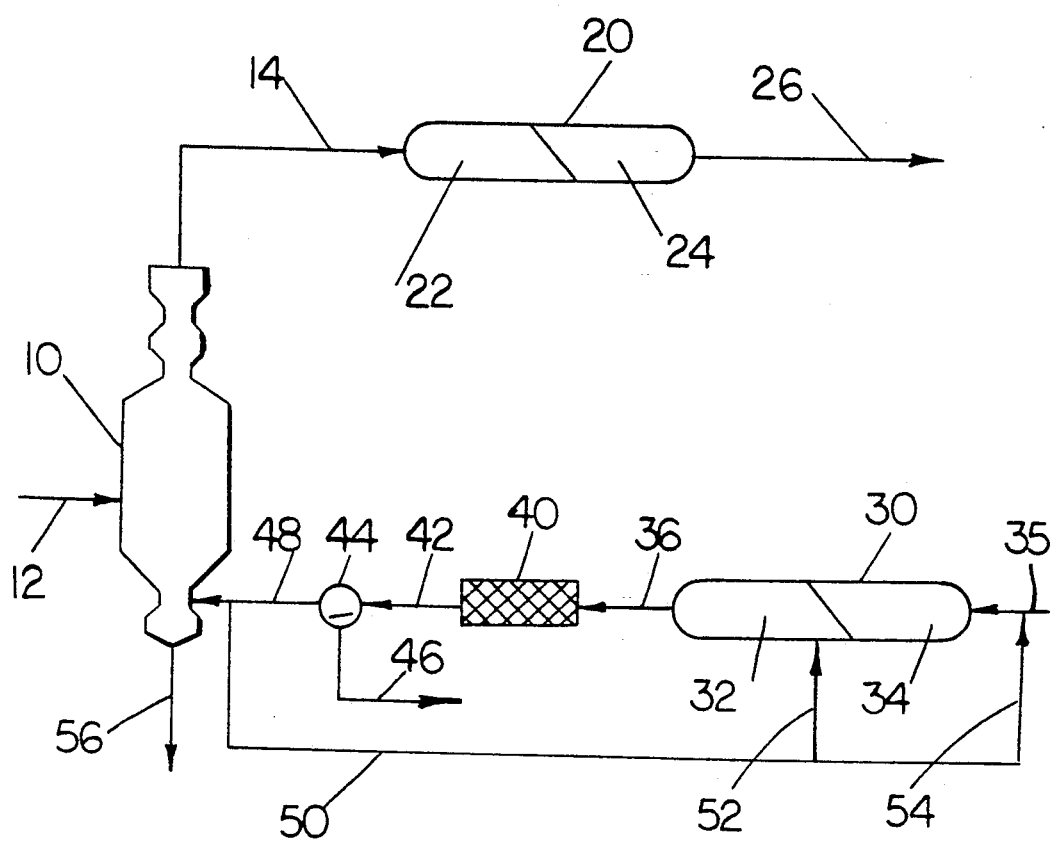
FIG. 1 is a schematic view, showing a fixed bed plant for desulfurization by absorption and regeneration of the sorbent chemicals.

This invention is a system for high temperature desulfurization of coal-derived gases using regenerable sorbents. One sorbent is stannic oxide (tin oxide, $SnO_2$), and the other sorbent is a metal oxide or mixed metal oxide such as zinc ferrite ($ZnFe_2O_4$). Certain otherwise undesirable by-products of the absorption/regeneration cycle, including hydrogen sulfide ($H_2S$) and sulfur dioxide ($SO_2$) are reused by the system, and elemental sulfur is produced in the regeneration reaction of the cycle. The invention also includes a system for refabricating the sorbent pellets.

In the discussion which follows, the various chemical reactions that occur in the desulfurization system, including the sulfur absorption and the sorbent regeneration cycles; and the various chemical reactions that occur in the pellet refabrication system will be discussed in overview. Following this, there will be descriptions of experimental results, a preferred embodiment, and a method of using the system of this invention for the high temperature desulfurization of coal gas.

Overview

In this overview, the chemical reactions of the desulfurization system will be discussed first. These reactions will include sulfur absorption steps and sorbent regeneration steps. Following that, the chemical reactions of the pellet refabrication system will be discussed.

In the following discussion, each of the reaction equations will be numbered, and, for ease of reference, will be consistently numbered throughout the remainder of this disclosure: equations 1–5 describe significant portions of the absorption/regeneration reactions of the desulfurization system; equations 6–10 describe significant portions of the pellet refabrication system.

The Desulfurization System Reactions.

The desulfurization system consists of an absorption/regeneration cycle. On the absorption side, sulfur contaminants are removed from hot coal gasifier-derived gases to the level of 20 parts per million or less, using regenerable sorbents. On the regeneration side of the process, the sorbents are regenerated together with elemental sulfur, which can be recovered and resold.

To produce this absorption/regeneration cycle, the system of this invention uses two sorbents, one of which is stannic oxide (tin oxide, $SnO_2$), and the other of which is a metal oxide, such as the already known zinc ferrite ($ZnFe_2O_4$) Because there are two sorbents, the absorption and regeneration step each have two sets of reactions, one for each of the sorbents. These will now be described, in turn, starting with the absorption reactions.

There are two absorption reactions, one with stannic oxide, and a second with another metal oxide as the sorbent.

A first reaction is the absorption of hydrogen sulfide by stannic oxide, forming stannous sulfide, and lowering the hydrogen sulfide concentration from 10,000–30,000 ppm to about 200–1,000 ppm (90–99% removal):

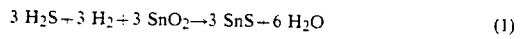

A second reaction is the absorption of hydrogen sulfide by zinc ferrite, forming ferrous sulfide and zinc sulfide, and lowering the hydrogen sulfide concentration to less than 20 ppm (greater than 99.8% removal):

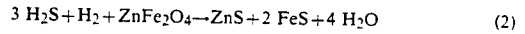

In this second reaction, it should be understood that other metal oxide or mixed metal oxide sorbents, such as zinc titanate, copper oxide, and manganese oxide (e.g., $Cu_2O$, FeO, $Fe_2O_3$, $Fe_3O_4$, $MnO_2$, ZnO, $ZnFe_2O_4$) could be used in place of zinc ferrite, producing the corresponding metal sulfides.

Following the absorption steps, there are regeneration reactions, in which the metal sulfide products of the absorption reactions 1 and 2 are reacted with with air to reform the metal-oxides and produce elemental sulfur, thereby regenerating the sorbents. With regenerated sorbents, the process can continue to cycle through successive absorption/regeneration phases.

There are two regeneration series, one to regenerate the stannic oxide sorbent from the stannous sulfide product of the absorption side; and one to regenerate the zinc ferrite sorbent from the zinc sulfide and ferrous sulfide products of the absorption side.

In a first regeneration reaction, air is blown into the zinc sulfide/iron sulfide species produced in the absorption reaction [reaction 2] to regenerate the zinc ferrite ($ZnFe_2O_4$) sorbent. This reaction will also yield sulfur dioxide ($SO_2$)

In a second regeneration reaction, the sulfur dioxide produced as a by-product of the zinc ferrite regeneration reaction [reaction 3] is reacted with the stannous sulfide (SnS) product of the absorption reaction [reaction 1], to regenerate the stannic oxide ($SnO_2$) sorbent. This reaction will also yield elemental sulfur in the gaseous state:

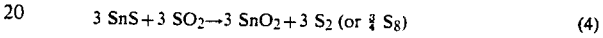

The overall, net chemical reaction for the absorption/regeneration phases may be represented as follows:

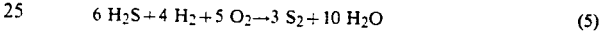

It may be seen that the net reaction involves the recovery of elemental sulfur from the hydrogen sulfide contaminants of the coal gas stream. In this net reaction, the sorbents are not represented because they are substantially unchanged after the cycle is completed.

It has been observed that the sulfur absorption reaction proceeds at a much better rate when the sorbents have a high surface area. During multiple absorption/regeneration cycles, the sorbent pellets are degraded, and surface area is lost. To replenish the degraded sorbents, it is necessary to recover the metal component and to refabricate the sorbent material. The reactions involved in the refabrication system will now be discussed.

The Pellet Refabrication System Reactions.

The absorption/regeneration system of this invention uses two sorbents. One sorbent is stannic oxide (tin oxide, $SnO_2$), and the other sorbent is a metal oxide or mixed metal oxide such as zinc ferrite ($ZnFe_2O_4$) The sorbents are formed into pellets, and the pellets are subjected to conditions of heat and chemical reactions which cause degradation. It is necessary, therefore, to recover and reform the sorbent in high surface area structures and to refabricate the pellets with the freshly recovered sorbent.

In the discussion which follows, it will be assumed that the sorbent being reformed and refabricated is the stannic oxide, and specific reactions will be given for recovering the tin; the corresponding reactions for refabricating the zinc ferrite sorbent, or any similar metal oxide or mixed metal oxide, are substantially identical and will not be separately discussed.

There are two ways in which pellet reformations can occur. The first way involves starting with the sulfided pellet (that is, the stannous sulfide product of the absorption side of the desulfurization system). The second way involves starting with the oxided pellet (that is, the stannic oxide product of the regeneration side of the desulfurization system). Each of these two series of reactions, termed "version 1" and "version 2", will be discussed, in turn.

Version 1. Starting with the stannous sulfide product of the absorption side of the system [reaction 1], a high surface area stannic oxide sorbent can be refabricated. A small portion of the sulfided pellet (stannous sulfide) inventory is removed from the absorption side of the process.

The stannous sulfide is reacted with sulfuric acid ($H_2SO_4$) to yield a stannous sulfate ($SnSO_4$) and hydrogen sulfide ($H_2S$):

$$SnS + H_2SO_4 \rightarrow SnSO_4 + H_2S \tag{6}$$

Unreacted sulfuric acid and solids will remain in solution. The solids are treated with hydrochloric acid (HCl) to remove the residual SnS in an aqueous solution. The resulting stannous chloride is then sent off-site to recover the tin content. The following discussion resumes with the stannous sulfate product ($SnSO_4$) of the sulfuric acid reaction [reaction 6].

Stannous sulfate decomposes at 360° C. to form a vary high surface area stannic oxide sorbent (the desired refabricated product). This reaction also yields sulfur dioxide ($SO_2$):

$$SnSO_4 \rightarrow SnO_2 + SO_2 \tag{7}$$

It can be seen that the net result of this reaction series is the reformation of the desired sorbent, stannic oxide ($SnO_2$), together with two by-products, hydrogen sulfide ($H_2S$) and sulfur dioxide ($SO_2$). Those by-products are generally undesirable, and would be problematic in another system. But in the system of this invention, both of those by-products are fuels for desired reactions, and can reinjected into the appropriate reaction chamber and consumed on site.

The hydrogen sulfide is reinjected into the absorption chamber, where the sorbents will work to desulfurize it at the same time that they desulfurize the main gas stream from the gasifier [reactions 1 and 2]; the sulfur dioxide is reinjected into the regeneration chamber where it will help to regenerate the stannic oxide [reaction 4].

Version 2: Starting with the stannic oxide product of the regeneration side of the system [reaction 4], a high surface area stannic oxide sorbent can be refabricated. A small portion of the oxided pellet (stannic oxide) inventory is removed from the regeneration side of the process.

The stannic oxide is reacted with sodium hydroxide (NaOH) to yield a sodium stannate ($Na_2Sn(OH)_6$)

$$SnO_2 + 2\ NaOH + 2\ H_2O \rightarrow Na_2Sn(OH)_6 \tag{8}$$

The sodium stannate then reacts with carbon dioxide ($CO_2$) forming a soluble sodium carbonate ($Na_2CO_3$) and an insoluble stannic hydroxide ($Sn(OH)_4$):

$$Na_2Sn(OH)_6 + CO_2 \rightarrow Sn(OH)_4 + Na_2CO_3 \tag{9}$$

The stannic hydroxide is thermally decomposed to form a high surface area stannic oxide sorbent (the desired refabricated product):

$$Sn(OH)_4 \rightarrow SnO_2 + 2\ H_2O \tag{10}$$

Either of these two methods of refabrication may be carried out on-site or off-site. On-site refabrication would use the heat released during regeneration and would save transportation costs; off-site refabrication could collect sorbents from more than one gasifier facility and might operate with significant economies of scale.

EXPERIMENTAL RESULTS

Experiments were conducted on the stannic oxide/stannous sulfide system to determine whether the absorption and regeneration reactions would proceed as expected. Additional experiments were conducted on the refabrication system to determine whether the sulfuric acid reformation of the stannic oxide sorbent would proceed as expected; work was also done on binder composition.

I. Absorption and Regeneration Reactions

The absorption reactions, previously given in overview, are these:

$$3\ H_2S + 3\ H_2 + 3\ SnO_2 \rightarrow 3\ SnS + 6\ H_2O \tag{1}$$

$$3\ H_2S + H_2 + ZnFe_2O_4 \rightarrow ZnS + 2\ FeS + 4\ H_2O \tag{2}$$

The regeneration reactions, previously given in overview, are these:

$$ZnS + 2\ FeS + 5\ O_2 \rightarrow ZnFe_2O_4 + 3\ SO_2 \tag{3}$$

$$3\ SnS + 3\ SO_2 \rightarrow 3\ SnO_2 + 3\ S_2 (\text{or } \tfrac{3}{8}\ S_8) \tag{4}$$

The net absorption/regeneration reaction, previously given in overview is this:

$$6\ H_2S + 4\ H_2 + 5\ O_2 \rightarrow 3\ S_2 + 10\ H_2O \tag{5}$$

Tests were carried out to determine whether the absorption and regeneration reactions for the stannic oxide/stannous sulfide systems (reactions 1 and 4) proceed as predicted, to make a preliminary evaluation of the reaction rate, and to test the effect of cycling.

Custom gas mixtures were obtained to simulate the composition of hot coal gas and regeneration gas. The sample gas used to simulate the hot coal gas stream from a Lurgi gasifier contained hydrogen sulfide, hydrogen, water vapor, and the balance nitrogen. This stream was passed through 335 K (62° C.) humidifier to add the proper amount of water vapor to the stream. Different concentrations of these gases were used to represent the gases from a KRW gasifier, and CO and $CO_2$ were included to determine whether coking might be a problem. Regeneration gases consisted of 10% $SO_2$, 40% $N_2$, and 50% $H_2O$ (added in the humidifier).

All experiments were performed at atmospheric pressure. Absorption experiments were carried out at 850 K, and regeneration experiments were conducted at both 850 K and 973 K. The gases flowed through heat-traced lines to a reactor which was contained in a temperature-controlled furnace. Powdered samples of the sorbent were held in a quartz reactor tube in the furnace. Outlet gases were cooled in a heat exchanger (which condensed the sulfur), and vented through a scrubber which removed any remaining $H_2S$ or $SnO_2$. After exposure to the gas stream, the specimens were removed from the reactor and tested for total sulfur content. Percent sulfur is determined by measuring the $SnO_2$ formed and carbon content was directly measured. Based upon the chemical analysis data, the sulfur loading of each specimen was calculated.

Stannic Oxide Preparation.

The reaction (1) between $H_2S$ and $SnO_2$ is a gas-solid reaction. Thus, once the $H_2S$ has reacted with the surface layer, the rate of reaction can be slowed by mass transfer through the solid. For the interior of the stannic oxide to react, oxygen must diffuse to the exterior, while sulfur diffuses to the interior. During the regeneration, the opposite processes must occur. Given that these processes are inherently slow, the surface area of the stannic oxide must be very large to reduce the diffusion length and, therefore, the time required for the reaction to occur.

Stannic oxide was prepared from several precursors to produce a high surface area sorbent. The precursors included stannous sulfate ($SnSO_4$), stannous oxalate ($SnC_2O_4$), and stannous nitrate ($Sn(NO_3)_2$) These materials were placed into a vented oven at 873 K (600° C.) and decomposed to form stannic oxide.

The stannic oxide produced from stannous sulfate had the highest surface area. Stannous sulfate is also commercially available in ton quantities, is water soluble, is the lowest cost precursor, and when decomposed, yields the lowest cost stannic oxide. Therefore, stannic oxide prepared from stannous sulfate was used in all of the stannic oxide absorption experiments.

Partway through the multiple cycle experiments, a sample was removed its surface area measured. The initial sample surface area was 30.6 m²/g, but due to the cycling, the area decreased to 0.5 m²/g. The sample maintained an ability to absorb and to be regenerated even with the reduced area. While the reactions continued, there may be a loss of reactivity with more extensive cycling. An answer is to remove a small portion of the sulfided pellet, and dissolve it in sulfuric acid to refabricate the high surface area stannic oxide. This is discussed below, in connection with reaction (6).

Absorption and Regeneration Experiments.

The general procedure for the absorption rests was to expose the sorbent to a gas with the same composition as the coal gas leaving a Lurgi gasifier for 10 hours, and to determine the extent of conversion by measuring the final composition of the sorbent.

In the first absorption experiment, 2 grams of stannic oxide were reacted for 10 hours with 2.7% hydrogen sulfide at 850 K, and a small sample was removed. Then the remaining sample was exposed for an additional 10 hours. On exposure to hydrogen sulfide, the sample changed from light yellow to grey black, a characteristic of stannous sulfate. The samples and sulfur content of each are described in the following table (which also describes the regeneration experiment, to be discussed subsequently):

| History | Theoretical content (wt) | Percent of Sulfur (wt) | Theoretical conversion |
| --- | --- | --- | --- |
| Fresh stannic oxide, 10 hours exposure to hydrogen sulfide | 20.94% | 21.3% | 98% |
| Second 10 hours exposure (20 hours total) | 18.6% | 21.3% | 85% |
| Above sample, 5 hours exposure to sulfur dioxide (conversion from SnS, 21.3% sulfur) | 2.9% | 0 | 86% |

The same experiment exposed stannic oxide to 2.7% hydrogen sulfide for 10 hours at 850 K. The sulfur content was 20.9% (wt) or 98% conversion. The same sample was then exposed to the same gas composition at 850 K for a second 10 hour period (20 hours total). The sulfur content after 20 hours was only 18.6% weight. The apparent loss is probably not real. From our review of the analysis results, an experimental error of about ±1.6% (wt) is expected. Thus, there could be the same mass of sulfur in the 10 and 20 hour samples and be within the experimental accuracy. The best way to express these data are 19.4%±1.9% sulfur or 91%±9% conversion of the stannic oxide to the stannous sulfide.

The data clearly indicated a nearly complete absorption reaction, as was predicted.

The first regeneration experiment was conducted with a small sample of the sulfur loaded specimen from the 20-hour exposure run. Over the 5 hours of exposure to the sulfur dioxide stream (reaction 4), the sample turned from gray-black to dark yellow in color (similar in color, but darker than, the original material). After 5 hours of reaction with sulfur dioxide, the sample was 2.9% (wt) sulfur or 86% regenerated to stannic oxide. The previous table shows the results.

Although it had been planned to run the first regeneration reaction for 10 hours, the experiment was shut down early because sulfur collected in the condenser and blocked the gas flow. Because the sample was sized for complete regeneration over 10 hours of flow, incomplete regeneration may have been a result of inadequate gas flow. The condenser was modified to prevent this problem from occurring in future experiments.

The next set of experiments was designed to measure the effect of reaction time on extent of reaction, and to determine whether or not the overall rate of conversion in absorption or regeneration would limit the operation of a stannic oxide system.

The absorption experiments were carried out for one-hour and five-hour durations. After the experiments were completed, samples of the sorbent were removed and the sulfur content analyzed to determine the fractional conversion of stannic oxide to stannous sulfide. The following table presents the measured sulfur content of the samples:

| History | Total sulfur content (wt) | Theoretical Sulfur (wt) | Percent of theoretical |
| --- | --- | --- | --- |
| One hour | 20.5% | 21.3% | 96% |
| Five hours | 21.2% | 21.3% | 99% |

After a one-hour exposure, to hydrogen sulfide, 96% of the stannic oxide was converted to the stannous sulfide. In the five-hour test, the conversion was 99%. Thus it is clear that the absorption reaction proceeds quite rapidly to completion.

The degree of regeneration as a function of reaction time was also determined. Initially, the sorbent was regenerated for 1, 2, and 5 hours at 850 K. Upon analysis, it became apparent that there was a reaction-time limitation. While the absorption reaction proceeded to completion in essentially one hour, regeneration was only 35% complete at one hour, 68% at five hours, and reached 94% only at ten hours. Therefore, the experiments were re-run at a higher temperature (973 K). In a real system, achieving this temperature is simple. The regeneration reactions are quite exothermic, and the higher temperature is achieve by simply reducing the amount of diluent mixed with the hot zinc ferrite regeneration gases. At 973 K, the reaction proceeded to 97% of completion in one hour, and 98% in two hours.

The next set of experiments involved multiple absorption/regeneration reactions to determine whether there was a loss of reactivity with repeated cycling in a stannic oxide system. A fresh specimen of stannic oxide was loaded inside the tube furnace and simulated coal gas stream (Lurgi) was flowed through the reactor for five hours, converting the stannic oxide to the stannous sulfide. The oven was cooled and a small sample removed for chemical analysis. A hot gas stream containing simulated zinc ferrite regeneration gases was then flowed through the reactor at 973 K. The specimen was exposed to these sulfur dioxide containing gases for five hours. After five absorption/regeneration cycles, a small sample was removed for analysis. Another five and one-half cycles were run, until the hydrogen sulfide cylinder was depleted.

The results demonstrated that, after five half-cycles, the reaction was still proceeding to completion; 84% of the sorbent was in proper sulfide form, which is essentially the same conversion obtained in the 1, 5, 10 and 20-hour experiments. After the tenth half-cycle, the sorbent was analyzed while in the oxide form. The sulfur content was 0.2%, corresponding to 99% regeneration. Finally, after 16 half-cycles, the sample was also analyzed while in the oxide state and, this time, the conversion to oxide was 99.9% of theoretical.

Thus, it was apparent that over the 16 half-cycles (8 full absorption/regeneration cycles) there was full regeneration of the sorbent, and no generation of undesirable side-products.

II. Refabrication (starting with product of 1 above)

The refabrication reactions that start with the stannous sulfide product of reaction 1, previously discussed in overview are these:

$$SnS + H_2SO_4 \rightarrow SnSO_4 + H_2S \quad (6)$$

$$SnSO_4 \rightarrow SnO_2 + SO_2 \quad (7)$$

The solubility of stannous sulfide (SnS) and stannic oxide ($SnO_2$) was tested in several solutions, including that of reaction (6) above.

Reaction (6) proved to be the most promising. Upon initial addition of the 5 ml concentrated sulfuric acid, there was little-to-no reaction. There seemed to be some bubbles forming, but slowly. This was placed on a hot plate, while stirring constantly at 60° C. for 4 hours. Almost immediately, the reaction started, and $H_2S$ was evolved. The solution turned from clear to yellow. Almost all of the SnS was dissolved, and only small pieces of yellow/white particles remained. There were several very small black pieces that could have been SnS. This was filtered and washed with distilled water. After drying, it appeared that only 4.5% of the original mass of SnS remained.

Further tests of reaction (6) were conducted to determine the solubility of SnS in a variety of sulfuric acid solutions. In these solutions, temperature, time and concentration were varied in order to determine the optimum conditions for the following reaction:

$$SnS + H_2SO_4 \rightarrow SnSO_4 + H_2S \quad (6)$$

In these tests, approximately 0.3 g of crushed stannic oxide was stirred with a given concentration of 100% excess sulfuric acid. This solution was stirred in a round bottom flask while being heated at a given temperature for 1 hour (unless otherwise mentioned). After this time, the round bottom was removed and the solid washed with approximately 200 ml distilled water. The sample was then filtered through a pre-weighed medium glass frit, dried and weighed on the glass frit to reduce error from transfer. Any $SnSO_4$ formed during the reaction would be washed away in the filtrate, ideally leaving only un-reacted SnS.

The first set of tests were run at 100° C. for 1 hour while varying the concentration of $H_2SO_4$ added at a 100% excess (that is, twice the stoichiometric quantity of sulfuric acid). The concentrations tested varied from 18 M to 2 M sulfuric acid. The following table summarizes the data for the first test, and the reported numbers are the solids remaining on the filter reported as a percentage of original mass.

| Molarity $H_2SO_4$ (in Moles) | Temperature (in degrees C.) | Time (in hours) | % Solids Remaining |
|---|---|---|---|
| 18 | 100 | 1 | 65% |
| 9 | 100 | 1 | 61.9 |
| 5 | 100 | 1 | 47.8 |
| 4.5 | 100 | 1 | 50.5 |
| 2 | 100 | 1 | 94 |

Other tests included variations in temperature and time and changes in excess acid in order to determine the optimum concentrations of sulfuric acid for maximum decomposition of SnS. The data from other variations in reaction conditions are presented below:

| Molarity $H_2SO_4$ (in Moles) | Temperature (in degrees C.) | Time (in hours) | % Solids Remaining |
|---|---|---|---|
| 18 | 200 | 0.5 | 67.6% |
| 9 | 200 | 0.5 | 86.1 |
| 9 | 25 | 48.0 | 88 |
| 9 | 150 | 1.0 | 60.8 |

After the above tests were run, there continued to be many questions about the identity of the solids remaining (most likely, unreacted SnS, together with elemental sulfur). To determine the actual solubility of SnS, the filtrate from the solid wash was analyzed with water. Ideally, all $SnSO_4$ that formed would wash away, due to its high solubility. The $SnSO_4$ could then be measured by decomposing the solid $SnSO_4$ into $SnO_2$ at 500° C. for 5 hours. The amount of $SnO_2$ recovered could then be equated with the amount of SnS reacted. This method of analysis was performed, with the time of reaction being varied:

| Molarity $H_2SO_4$ (in Moles) | Temperature (in degrees C.) | Time (in hours) | % Solids Remaining |
|---|---|---|---|
| 9 | 100 | 1 | 61.9% |
| 9 | 100 | 2 | 51.1 |
| 9 | 100 | 5 | 50.3 |

A final test was run on another sample of SnS for variability with changing percentages of excess sulfuric acid present. After the initial test, concentrated HCl was added to the solids remaining on the filter. This slurry was stirred, and any SnS still present dissolved, leaving only what was assumed to be elemental sulfur $$2 HCl + SnS \rightarrow SnCl_2 + H_2S$$

This addition allowed the analysis of both the solid and the filtrate from the initial reaction with sulfuric acid. All solutions were run in 9 M sulfuric acid for 0.5 hours at 100° C. The results were as follows:

| Molarity $H_2SO_4$ (in Moles) | % Excess Acid | Time (in hours) | % Reacted |
|---|---|---|---|
| 9 | 100 | 0.5 | 60% |
| 9 | 200 | 0.5 | 72 |
| 9 | 400 | 0.5 | 73 |

To minimize the cost of refabricating pellets, either no binders or low cost expendable binders must be used. The following table lists several materials that could be used as a binder for stannic oxide (note that stannic oxide has a melting point of 1630° C.; using the rule of thumb that a material will sinter at two-thirds of its absolute temperature, it is anticipated that stannic oxide will sinter at about 1000° C.):

| Material | Chemical Formula | Melting Point (in degrees C.) | Sintering Temperature °C. |
|---|---|---|---|
| Stannic oxide | $SnO_2$ | 1630 | 996 |
| Bentonite | $SiO_2$ (and others) | 1600–1700 | 975 |
| Silica | $SiO_2$ | 1710 | 1049 |
| Sodium Metasilicate | $Na_2SiO_3$ | 1088 | 634 |
| Zinc Oxide | $ZnO$ | 1970 | 1495 |
| Willemite | $ZnSiO_4$ | 1512 | 917 |
| Rhodonite, Tephroite | $MnSiO_3$ | 1270 | 756 |
| Manganosite | $MnO$ | 1785 | 1099 |
| Alumina ($\alpha$) | $Al_2O_3$ | 2015 | 1252 |
| Alumina ($\alpha$) | $Al_2O_3$ | 2050 | 1276 |

A pellet of stannic oxide with water to hold the green pellet together until fired has been prepared. After firing at 1000° C. for 5 hours, the pellet had a crush strength of 6 pounds, the surface area was still 4 m²/g versus 9 m²/g of the powder before processing into a pellet. It can be seen that there are many candidate inorganic binders available with a wide range of pellet pressing pressures, quantities of water or other expendable green pellet binders, firing temperatures and duration of firing.

The most promising of the binders appears to be a bentonite (silica/alumina clay). The sintering temperature is approximated to be 975° C. Bentonites alone form very hard pellets with low porosity, but crush strengths of up to 2020 psi. The surface area of the unfired bentonite was measured at 36 m²/g. After firing at 1000° C. for 5 hours, the bentonite sintered and had a surface area of 0.5 m²/g. The material was also fired at 900° C. for 5 hours; again the bentonite sintered and had a surface area of 1.1 m²/g.

Preferred Embodiments

Having provided an overview of the various reactions that occur in the desulfurization (absorption/regeneration) system and in the refabrication system of this invention, the embodiments of the invention in a fixed bed desulfurization plant, a moving bed desulfurization plant, and in a pellet refabrication facility will now be discussed. In this discussion, the reaction equations will be numbered for reference, keeping the same reference numbers as have been used in the previous overview of the system.

Plant for Desulfurization (fixed bed absorption of hydrogen sulfide and regeneration of sorbent chemicals):

With reference to FIG. 1, it can be seen, schematically, that a fixed bed plant includes a coal gasifier 10; an absorbing bed 20 having a stannic oxide (tin oxide, $SnO_2$) portion 22, and a zinc ferrite ($ZnFe_2O_4$) portion 24; a regenerating bed 30, having a zinc sulfide/iron sulfide portion 34 and a stannous sulfide portion 32; and a heat exchanger 40 and condenser 44. It should be noted that, after the sorbents in the absorbing bed 20 become saturated with sulfur, the absorbing bed 20 changes to the regenerating bed 30 by a system of valves (not shown).

Coal is introduced into the gasifier 10 by an inlet system 12. As the coal is gasified in the gasifier 10, a hot gas outlet stream is passed through the absorbing bed 20 by the transport system 14. The hot gas in the absorbing bed 20 contains hydrogen sulfide ($H_2S$).

In the absorbing bed 20, two absorption reactions occur, one with stannic oxide in the stannic oxide portion 22 of the bed 20, and a second with zinc ferrite in the zinc ferrite portion 24 of the bed 20.

A first reaction, occurring in the stannic oxide portion 22 of the bed, is the absorption of hydrogen sulfide by stannic oxide, forming stannous sulfide, and reducing the hydrogen sulfide concentration from 10,000–30,000 ppm to about 200–1,000 ppm (90–99% removal):

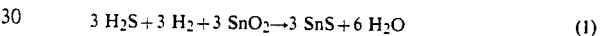

$$3\ H_2S + 3\ H_2 + 3\ SnO_2 \rightarrow 3\ SnS + 6\ H_2O \tag{1}$$

The hydrogen sulfide-containing gas stream is then passed from the stannic oxide portion 22 of the bed 20 to the zinc ferrite portion 24. As the stannic oxide portion 22 of the bed becomes more fully converted to the stannous sulfide product [reaction 1], the stannic oxide portion 22 becomes less able to absorb hydrogen sulfide, and the concentration of hydrogen sulfide entering the zinc ferrite portion 24 increases.

A second reaction, occurring in the zinc ferrite portion 24 of the bed, is the absorption of hydrogen sulfide by zinc ferrite, forming ferrous and zinc sulfides, and lowering the hydrogen sulfide concentration to less than 20 ppm (greater than 99.8% removal):

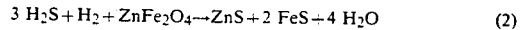

$$3\ H_2S + H_2 + ZnFe_2O_4 \rightarrow ZnS + 2\ FeS + 4\ H_2O \tag{2}$$

The zinc ferrite portion 24 of the bed 20 is sized to have roughly the same sulfur-absorption capacity as the stannic oxide portion 22. The zinc ferrite portion 24 will continue to absorb hydrogen sulfide until this portion of the bed is also saturated.

In this reaction [reaction 2], it should be understood that other metal oxide or mixed metal oxide sorbents, such as zinc titanate, copper oxide, and manganese oxide (e.g., $Cu_2O$, $FeO$, $Fe_2O_3$, $Fe_3O_4$, $MnO_2$, $ZnO$, $ZnFe_2O_4$) could be used in place of zinc ferrite, producing the corresponding metal sulfides. The zinc ferrite portion 24 of the bed 20 would simply be loaded with the other metal oxide or mixed metal oxide sorbent. In any event, this second portion of the bed 20 acts as a polishing agent and further reduces the concentration of hydrogen sulfide to less than 20 ppm.

Clean gas exits the absorbing bed by way of outlet system 26.

Following the absorption steps, there are regeneration reactions, in which the metal sulfide products of the absorption reactions [reactions 1 and 2] are reacted with air to reform the metal-oxides and produce elemental sulfur, thereby regenerating the sorbents. With regenerated sorbents, the process can continue to cycle through successive absorption/regeneration phases.

The absorbing bed 20 is taken off line, purged with steam to remove flammable gasses such as H$_2$ and CO, and moved into the position shown at 30 in FIG. 1, where the bed now functions as the regenerating bed 30. By way of inlet system 35, air is blown into the zinc sulfide/iron sulfide portion 34 of the regenerating bed 30, where the zinc sulfide and iron sulfide species produced in the absorbing bed [reaction 2] react to regenerate the zinc ferrite (ZnFe$_2$O$_4$) sorbent. This reaction will also yield sulfur dioxide (SO$_2$):

$$ZnS + 2\ FeS + 5\ O_2 \rightarrow ZnFe_2O_4 + 3\ SO_2 \quad (3)$$

The sulfur dioxide-containing air stream is then passed from the zinc sulfide/iron sulfide portion 34 of the regenerating bed 30 to the stannous sulfide portion 32.

In a second regeneration reaction, the sulfur dioxide produced as a by-product of the zinc ferrite regeneration reaction [reaction 3] is reacted with the stannous sulfide (SnS) product of the absorption reaction [reaction 1] and which is now located in the stannous sulfide portion 32 of the regenerating bed 30, to regenerate the stannic oxide (SnO$_2$) sorbent. This reaction will also yield elemental sulfur (S$_8$, S$_2$, and other forms of sulfur):

$$3\ SnS + 3\ SO_2 \rightarrow 3\ SnO_2 + 3\ S_2\ (or\ \tfrac{3}{8}\ S_8) \quad (4)$$

The elemental sulfur, in gaseous phase, is carried out of the regenerating bed 30 by outlet system 36, and passed through a heat exchanger 40 with the other outlet gases in the gas stream. The heat exchanger 40 cools the outlet gases, and a portion of the cooled gases will be reintroduced into the regenerating bed 30, after the elemental sulfur has been removed. From the heat exchanger 40, the outlet gases are passed by connecting system 42 to a condenser 44, where the elemental sulfur is converted to the liquid phase and is drawn off by discharge system 46 for recovery.

The cooled outlet gases, still containing some unreacted sulfur dioxide, are directed from the condenser 44 through connecting system 48. Connecting system 48 draws some of the gas back into the gasifier 10, and draws the remainder of the cooled gas back through the regenerating bed 30 by way of recirculating system 50. The recirculated cooled gas is directed back into the stannous sulfide portion 32 of the regenerating bed 30 by connecting system 52; and is directed back through the inlet system 35 of the regenerating bed by connecting system 54. Waste ash is removed at outlet 56 of the gasifier 10.

The sulfur dioxide content of the recirculated cooled gas provides additional fuel to the regeneration reaction in the regenerating bed 30. Moreover, because both of the regeneration reactions are exothermic (heat generating), the cooled gas serves to help bring the temperature down in the regenerating bed.

The overall, net chemical reaction for the absorption/regeneration phases may be represented as follows:

$$6\ H_2S + 4\ H_2 + 5\ O_2 \rightarrow 3\ S_2 + 10\ H_2O \quad (5)$$

It may be seen that the net reaction involves the recovery of elemental sulfur from the hydrogen sulfide contaminants of the coal gas stream. In this net reaction, the sorbents are not represented because they are substantially unchanged after the cycle is completed.

Figure 2:
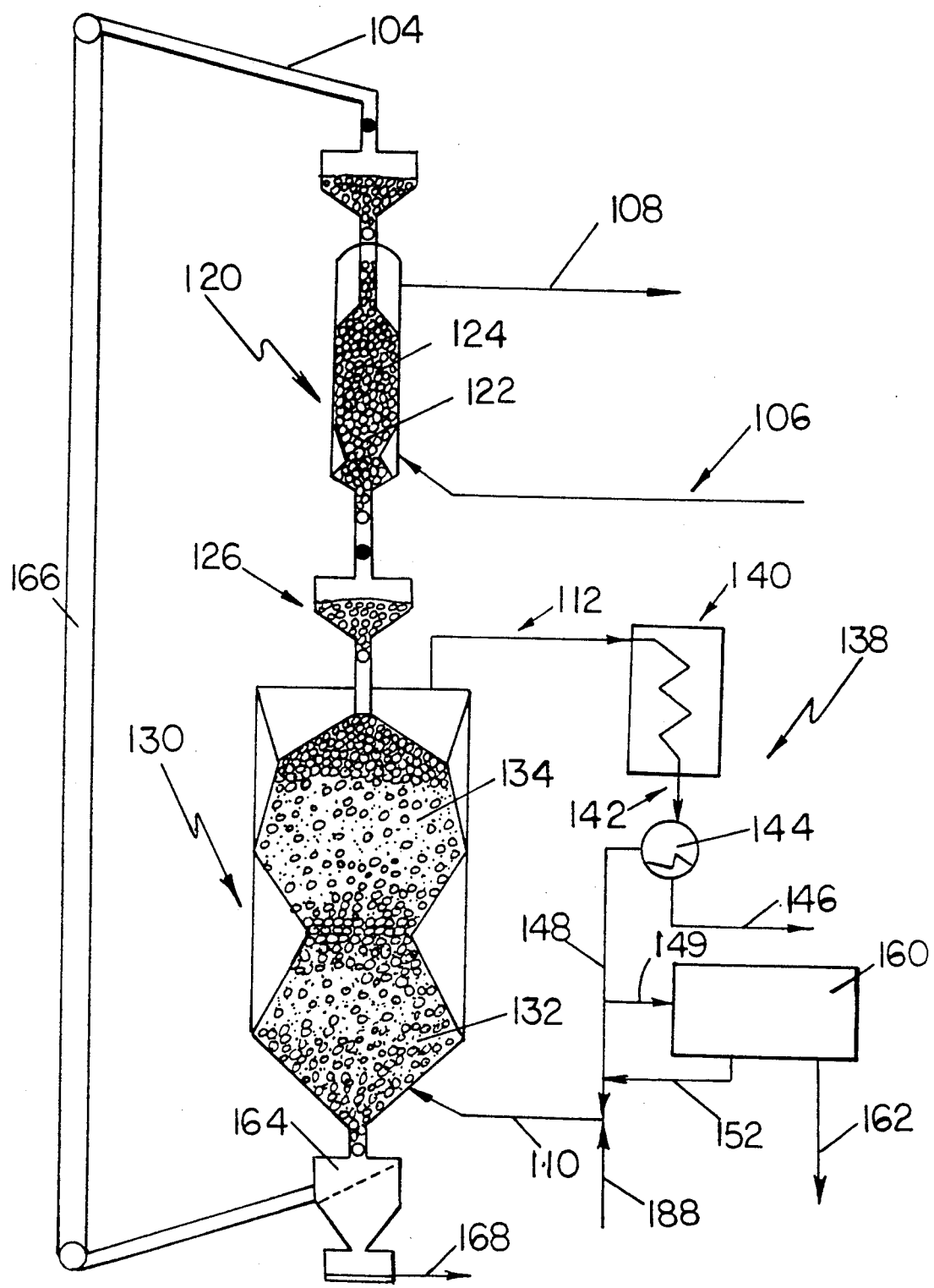
FIG. 2 is a schematic view, showing a moving bed plant for desulfurization by absorption and regeneration of the sorbent chemicals.

Plant for Desulfurization (moving bed absorption of hydrogen sulfide and regeneration of sorbent chemicals):

A fixed bed system has just been described. It is possible to carry out the same reactions in a moving bed plant, and such a plant may be more efficient. With reference to FIG. 2, it can be seen, schematically, that a moving bed plant has three main components, an absorber 120, a regenerator 130, and a regenerator gas treatment facility 138.

The absorber 120 has a lower portion 122 and an upper portion 124. The stannic oxide and zinc ferrite sorbents are mixed at all points in the system, and the sorbent pellets are introduced into the upper portion 124 of the absorber 120 by the pellet injector system 104 (e.g., lock hoppers). A gasifier inlet system 106 introduces the hydrogen sulfide containing-outlet gas stream from the gasifier (not shown in FIG. 2) into the lower portion 122 of the absorber 120. A clean gas outlet system 108 draws off the clean gas (having less than 20 ppm sulfur dioxide) from the upper portion 124 of the absorber 120.

Based upon thermodynamic calculations, the absorption reactions occurring in the absorber 120 will be naturally stratified. The highest concentration of hydrogen sulfide will be in the lower portion 122 of the absorber 120, near the inlet 106. The lowest concentration of hydrogen sulfide will be in the upper portion 124 of the absorber 120, near the outlet 108.

Stannic oxide will not absorb hydrogen sulfide at low concentrations, but zinc ferrite will. Therefore, since all the sorbent pellets are added to the top of the absorber, it is zinc ferrite which absorbs hydrogen sulfide in the upper portion 124 of the absorber 120 (forming zinc sulfide and iron sulfide), while the stannic oxide is essentially inert.

As the pellets move downwards in the absorber 120, the zinc ferrite becomes saturated with hydrogen sulfide, and the hydrogen sulfide concentration increases. Accordingly, and as the pellets approach the gas inlet 106 in the lower portion 122 of the absorber, the stannic oxide begins to absorb hydrogen sulfide (forming stannous sulfide).

Thus, it can be seen that the same two absorption reactions previously discussed occur in the moving bed absorber 120 of the moving bed system:

$$3\ H_2S + 3\ H_2 + 3\ SnO_2 \rightarrow 3\ SnS + 6\ H_2O \quad (1)$$

$$3\ H_2S + H_2 + ZnFe_2O_4 \rightarrow ZnS + 2\ FeS + 4\ H_2O \quad (2)$$

Reaction 1 occurs in the lower portion 122 of the absorber 120, and reaction 2 occurs in the upper portion 124 of the absorber. The two reactions lower the hydrogen sulfide concentration to less than 20 ppm (greater than 99.8% removal). Clean gas is released at the outlet 108.

The natural stratification of reactions in the moving bed in the absorber 120 allows the mixture of the two sorbents throughout the absorber and avoids the need for two, separate absorption reactors. As before, it should be understood that another metal oxide or mixed metal oxide sorbents, such as zinc titanate, copper oxide, and manganese oxide (e.g., Cu$_2$O, FeO, Fe$_2$O$_3$, Fe$_3$O$_4$, MnO$_2$, ZnO, ZnFe$_2$O$_4$) could be used in place of zinc ferrite in reaction 2, producing the corresponding metal sulfides.

Following the absorption steps, there are regeneration reactions, in which the metal sulfide products of the absorption reactions [reactions 1 and 2] are reacted with air to reform the metal-oxides and produce elemental sulfur, thereby regenerating the sorbents. The regeneration reactions occur in the regenerator 130.

The regenerator 130 has a lower portion 132 and an upper portion 134. The pellets, now saturated with sulfur, are mixed at all points in the system, and the sulfided pellets are introduced into the upper portion 134 of the regenerator 130 by pellet injector system 126. An inlet system 188 introduces oxygen into the lower portion 132 of the regenerator 130 by way of inlet 110. A regenerator gas outlet system 112 draws off the regenerator outlet gas (containing elemental sulfur and sulfur dioxide) from the upper portion 134 of the absorber 130 and directs it into the regenerator gas treatment facility 138.

The regeneration reactions occurring in the regenerator 130 will be naturally stratified. Air is introduced at the lower portion 132 of the bed. In the lower portion of the bed, air reacts with the zinc sulfide (ZnS) and iron sulfide (FeS) to regenerate the zinc ferrite (ZnFe$_2$O$_4$) sorbent and to yield sulfur dioxide (SO$_2$), eliminating the oxygen in the process.

The sulfur dioxide-rich regeneration gases then move to the upper portion 134 of the moving bed where the sulfur dioxide reacts with stannous sulfide (SnS) to regenerate stannic oxide (SnO$_2$) and to yield elemental sulfur in the gaseous state.

Thus, it can be seen that the same two regeneration reactions previously discussed occur in the moving bed regenerator 130 of the moving bed system:

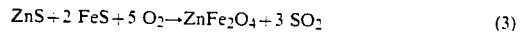

$$ZnS + 2\ FeS + 5\ O_2 \rightarrow ZnFe_2O_4 + 3\ SO_2 \quad (3)$$

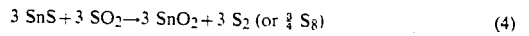

$$3\ SnS + 3\ SO_2 \rightarrow 3\ SnO_2 + 3\ S_2 \text{ (or } \tfrac{3}{4}\ S_8) \quad (4)$$

Reaction 3 occurs in the lower portion 132 of the regenerator 130, and reaction 4 occurs in the upper portion 134 of the regenerator (it should be noted that, in the upper portion of the regenerator, the sulfur dioxide concentration is low and the elemental sulfur concentration is high: under these conditions, stannous sulfide (SnS$_2$) forms; however, all of the stannous sulfide will be converted to stannic sulfide (SnS), and reaction 4 will be completed essentially as shown —it has been found that the recirculation of sulfur dioxide exiting the bed aids this process).

The elemental sulfur from reaction 4, in gaseous phase, is carried out of the regenerator 130 by outlet system 112, and passed into the regenerator gas treatment facility 138 with the other outlet gases in the gas stream.

In the regenerator gas treatment facility 138, a heat exchanger 140 cools the outlet gases, and the cooled gases will be reintroduced into the regenerator 130, after the elemental sulfur has been removed. From the heat exchanger 140, the outlet gases are passed by connecting system 142 to a condenser 144, where the elemental sulfur is converted to the liquid phase and is drawn off by discharge system 146 for recovery.

The cooled outlet gases, still containing some unreacted sulfur dioxide, are directed from the condenser 144 through connecting system 148. Connecting system 148 draws the gas into a tail gas treatment plant 160 by way of inlet 149. The tail gas treatment plant 160 contains a heat exchanger (not separately shown in FIG. 2) which cools the gas, and a vent 162 for releasing the treated tail gas. It should be noted that the tail gas treatment plant contains facilities for concentrating the sulfur dioxide—the concentrated sulfur dioxide is recycled through the regenerator by way of outlet 152; the vented gas released through vent 162 is relatively free of sulfur dioxide.

The cooled gas from the tail gas treatment plant 160 is drawn back through the regenerator 130 by connecting system or outlet 152. The cooled gas is mixed with air entering at inlet 188, and recirculated through the regenerator 130 by inlet 110.

The sulfur dioxide content of the recirculated cooled gas provides additional fuel to the regeneration reaction in the regenerator 130. Moreover, because both of the regeneration reactions are exothermic (heat generating), the cooled gas serves to help bring the temperature down in the regenerator.

Finally, at the outlet 164 of the regenerator 130, the pellets carry the regenerated sorbents, stannic oxide and zinc ferrite (the products of reactions 3 and 4). The elevator 166 transports the regenerated sorbent pellets to the pellet inlet 104 of the absorber 120 for additional cycles through the system. Fines are removed downstream of the outlet 164 at removal outlet 168.

The overall, net chemical reaction for the absorption/regeneration phases may be represented as follows:

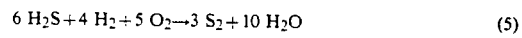

$$6\ H_2S + 4\ H_2 + 5\ O_2 \rightarrow 3\ S_2 + 10\ H_2O \quad (5)$$

It may be seen that the net reaction involves the recovery of elemental sulfur from the hydrogen sulfide contaminants of the coal gas stream. In this net reaction, the sorbents are not represented because they are substantially unchanged after the cycle is completed.

Figure 3:
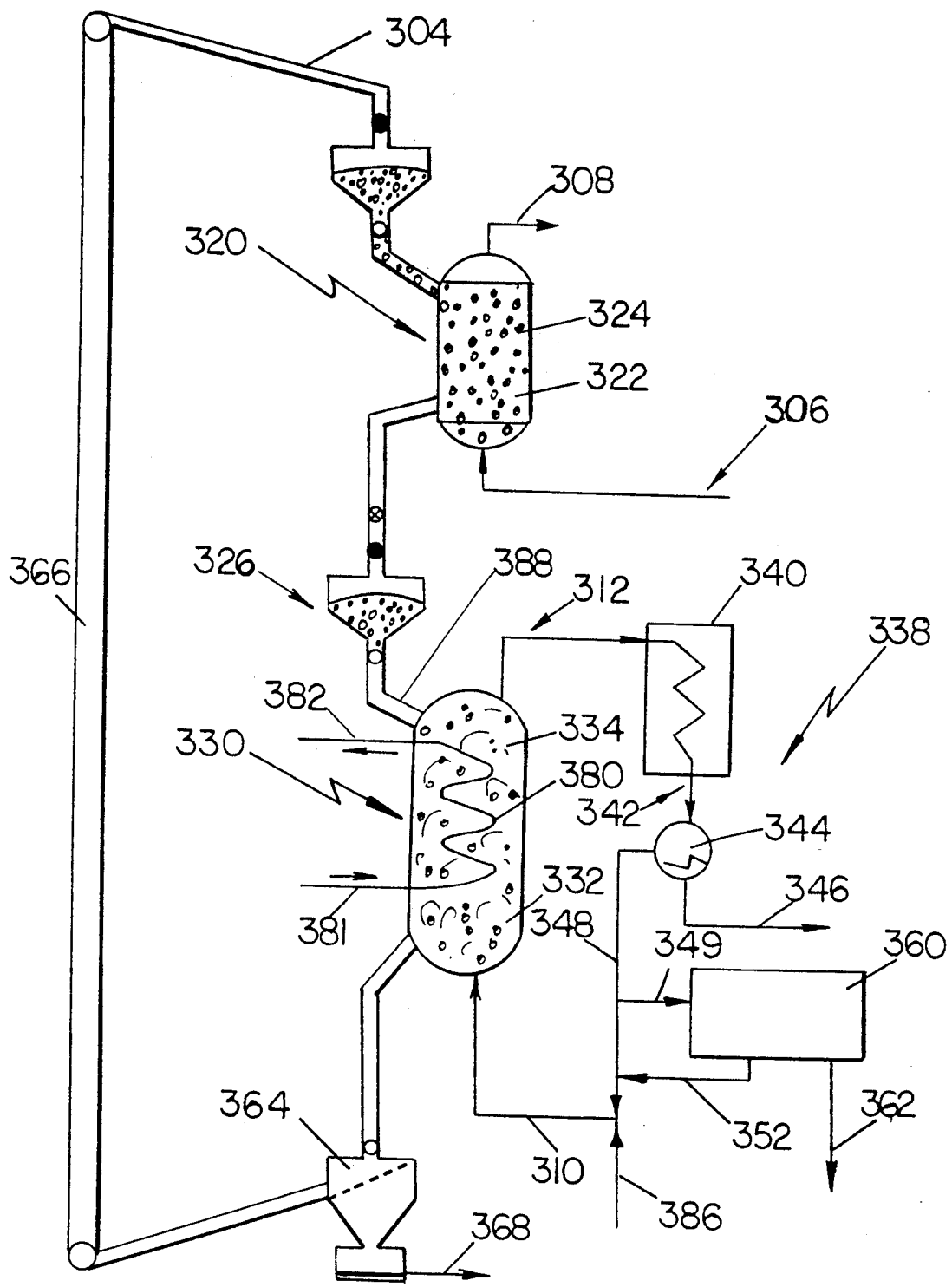
FIG. 3 is a schematic view, showing a fluidized bed plant for desulfurization by absorption and regeneration of the sorbent chemicals.

Plant for Desulfurization (fluidized bed absorption of hydrogen sulfide and regeneration of sorbent chemicals):

A fixed bed and a moving bed system have just been described. It is possible to carry out the same reactions in a fluidized bed plant, and such a plant may be more efficient, since the heat of reactions can be removed directly in the fluidized bed. With reference to FIG. 3, it can be seen, schematically, that a fluidized bed plant has three main components, an absorber 320, a regenerator 330, and a regenerator gas treatment facility 338.

The absorber 320 has a lower portion 322 and an upper portion 324. The stannic oxide and zinc ferrite sorbents are mixed at all points in the system, and the sorbent pellets are introduced into the upper portion 324 of the absorber 320 by the pellet injector system 304 (e.g., lock hoppers). A gasifier inlet system 306 introduces the hydrogen sulfide containing-outlet gas stream from the gasifier (not shown in FIG. 3) into the lower portion 322 of the absorber 320. A clean gas outlet system 308 draws off the clean gas (having less than 20 ppm sulfur dioxide) from the upper portion 324 of the absorber 320.

Based upon thermodynamic calculations, the absorption reactions occurring in the absorber 320 will be naturally stratified. The highest concentration of hydrogen sulfide will be in the lower portion 322 of the absorber 320, near the inlet 306. The lowest concentration of hydrogen sulfide will be in the upper portion 324 of the absorber 320, near the outlet 308. The fluidized bed reactor mixes all of these components rapidly on the small sorbent particles producing a rapid reaction. The rate of reaction is higher than either fixed bed or moving bed absorbers. Thus, the fluidized bed is a smaller reactor and has less sorbent in the system.

Stannic oxide will not absorb hydrogen sulfide at low concentrations, but zinc ferrite will. Therefore, since all the sorbent pellets are added to the top of the absorber, it is zinc ferrite which absorbs hydrogen sulfide in the upper portion 324 of the absorber 320 (forming zinc sulfide and iron sulfide), while the stannic oxide is essentially inert.

As the pellets move downwards in the absorber 320, the zinc ferrite becomes saturated with hydrogen sulfide, and the hydrogen sulfide concentration increases. Accordingly, and as the pellets approach the gas inlet 306 in the lower portion 322 of the absorber, the stannic oxide begins to absorb hydrogen sulfide (forming stannous sulfide).

Thus, it can be seen that the same two absorption reactions previously discussed occur in the fluidized bed absorber 320 of the fluidized bed system:

$$3 H_2S + 3 H_2 + 3 SnO_2 \rightarrow 3 SnS + 6 H_2O \quad (1)$$

$$3 H_2S + H_2 + ZnFe_2O_4 \rightarrow ZnS + 2 FeS + 4 H_2O \quad (2)$$

Reaction 1 occurs in the lower portion 322 of the absorber 320, and reaction 2 occurs in the upper portion 324 of the absorber. The two reactions lower the hydrogen sulfide concentration to less than 20 ppm (greater than 99.8% removal). Clean gas is released at the outlet 308.

The natural stratification of reactions in the fluidized bed in the absorber 320 allows the mixture of the two sorbents throughout the absorber and avoids the need for two, separate absorption reactors. As before, it should be understood that another metal oxide or mixed metal oxide sorbents, such as zinc titanate, copper oxide, and manganese oxide (e.g., $Cu_2O$, $FeO$, $Fe_2O_3$, $Fe_3O_4$, $MnO_2$, $ZnO$, $ZnFe_2O_4$) could be used in place of zinc ferrite in reaction 2, producing the corresponding metal sulfides.

Following the absorption steps, there are regeneration reactions, in which the metal sulfide products of the absorption reactions [reactions 1 and 2] are reacted with air to reform the metal-oxides and produce elemental sulfur, thereby regenerating the sorbents. The regeneration reactions occur in the regenerator 330.

The regenerator 330 has a lower portion 332 and an upper portion 334. The pellets, now saturated with sulfur, are mixed at all points in the system, and the sulfided pellets are introduced into the upper portion 334 of the regenerator 330 by pellet injector system 326. An inlet system 388 introduces oxygen into the lower portion 332 of the regenerator 330 by way of inlet 310. A regenerator gas outlet system 312 draws off the regenerator outlet gas (containing elemental sulfur and sulfur dioxide) from the upper portion 334 of the absorber 330 and directs it into the regenerator gas treatment facility 338.

The regeneration reactions occurring in the regenerator 330 will be naturally stratified. Air is introduced at the lower portion 332 of the bed. In the lower portion of the bed, air reacts with the zinc sulfide (ZnS) and iron sulfide (FeS) to regenerate the zinc ferrite ($ZnFe_2O_4$) sorbent and to yield sulfur dioxide ($SO_2$), eliminating the oxygen in the process.

The sulfur dioxide-rich regeneration gases then move to the upper portion 334 of the fluidized bed where the sulfur dioxide reacts with stannous sulfide (SnS) to regenerate stannic oxide ($SnO_2$) and to yield elemental sulfur in the gaseous state.

Thus, it can be seen that the same two regeneration reactions previously discussed occur in the fluidized bed regenerator 330 of the fluidized bed system:

$$ZnS + 2 FeS + 5 O_2 \rightarrow ZnFe_2O_4 + 3 SO_2 \quad (3)$$

$$3 SnS + 3 SO_2 \rightarrow 3 SnO_2 + 3 S_2 \text{ (or } \tfrac{3}{8} S_8) \quad (4)$$

Reaction 3 occurs in the lower portion 332 of the regenerator 330, and reaction 4 occurs in the upper portion 334 of the regenerator (it should be noted that, in the upper portion of the regenerator, the sulfur dioxide concentration is low and the elemental sulfur concentration is high: under these conditions, stannous sulfide ($SnS_2$) forms; however, all of the stannous sulfide will be converted to stannic sulfide (SnS), and reaction 4 will be completed essentially as shown —it has been found that the recirculation of sulfur dioxide exiting the bed aids this process).

The elemental sulfur from reaction 4, in gaseous phase, is carried out of the regenerator 330 by outlet system 312, and passed into the regenerator gas treatment facility 338 with the other outlet gases in the gas stream.

In the regenerator gas treatment facility 338, a heat exchanger 340 cools the outlet gases, and the cooled gases will be reintroduced into the regenerator 330, after the elemental sulfur has been removed. From the heat exchanger 340, the outlet gases are passed by connecting system 342 to a condenser 344, where the elemental sulfur is converted to the liquid phase and is drawn off by discharge system 346 for recovery.

The cooled outlet gases, still containing some unreacted sulfur dioxide, are directed from the condenser 344 through connecting system 348. Connecting system 348 draws the gas into a tail gas treatment plant 360 by way of inlet 349. The tail gas treatment plant 360 contains a heat exchanger (not separately shown in FIG. 3) which cools the gas; and a vent 362 for releasing the treated tail gas. It should be noted that the tail gas treatment plant contains facilities for concentrating the sulfur dioxide—the concentrated sulfur dioxide is recycled through the regenerator by way of outlet 352; the vented gas released through vent 362 is relatively free of sulfur dioxide.

The cooled gas from the tail gas treatment plant 360 is drawn back through the regenerator 330 by connecting system 352. The cooled gas is mixed with air entering at inlet 388, and recirculated through the regenerator 330 by inlet 310.

The sulfur dioxide content of the recirculated cooled gas provides additional fuel to the regeneration reaction in the regenerator 330. Moreover, because both of the regeneration reactions are exothermic (heat generating), the cooled gas serves to help bring the temperature down in the regenerator.

Finally, at the outlet 364 of the regenerator 330, the pellets carry the regenerated sorbents, stannic oxide and zinc ferrite (the products of reactions 3 and 4). The elevator 366 transports the regenerated sorbent pellets to the pellet inlet 304 of the absorber 320 for additional cycles through the system. Fines are removed downstream of the outlet 364 at removal outlet 368.

The overall, net chemical reaction for the absorption/regeneration phases may be represented as follows:

$$6 H_2S + 4 H_2 + 5 O_2 \rightarrow 3 S_2 + 10 H_2O \quad (5)$$

It may be seen that the net reaction involves the recovery of elemental sulfur from the hydrogen sulfide contaminants of the coal gas stream. In this net reaction, the sorbents are not represented because they are substantially unchanged after the cycle is completed.

Three plants have just been described: a fixed bed plant, a moving bed plant, and a fluidized bed plant. The fixed bed plant had a single bed, in which the sorbents were mixed in relatively discrete portions. The moving bed and fluidized bed plants both involved mixed sorbents throughout the system. From what has been described, many variations should be apparent to those skilled in the art without further elaboration here. For example, a fixed bed plant might have separate beds (one for each of the sorbents), or it might have a single bed in which the sorbents are completely mixed (with the reactions proceeding by natural stratification). There is no need to illustrate such variations with additional drawings.

Now that the desulfurization system of this invention has been described, a plant for accomplishing the refabrication system of this invention will be described.

Plant for Refabrication (removal of fractions from absorption/regeneration chambers and refabrication of pellets):

The refabrication system of this invention performs reactions 6 through 10, previously discussed in the overview. Under one version, refabrication begins with the sulfided products of the absorption side of the desulfurization process (reactions 1 and 2) and proceeds, according to reactions 6 and 7, to reform a high surface area sorbent. Under a second version, refabrication begins with the oxided products of the regeneration side of the desulfurization process (reactions 3 and 4) and proceeds, according to reactions 8-10, to reform the same high surface area sorbent.

In the interest of brevity, the following description of a refabrication plant will be directed towards a plant accomplishing the first version (reactions 6 and 7), and will be directed towards reforming and refabricating the high surface area stannic oxide sorbent. It should be understood that a plant accomplishing the second version (reactions 8-10) is easily constructed, and need not be further discussed here. Likewise, the reforming and refabricating of the second sorbent, including zinc ferrite or other metal oxide or mixed metal oxide sorbent, is apparent in light of the stannic oxide treatment. This, too, will not be further discussed here.

Figure 4:
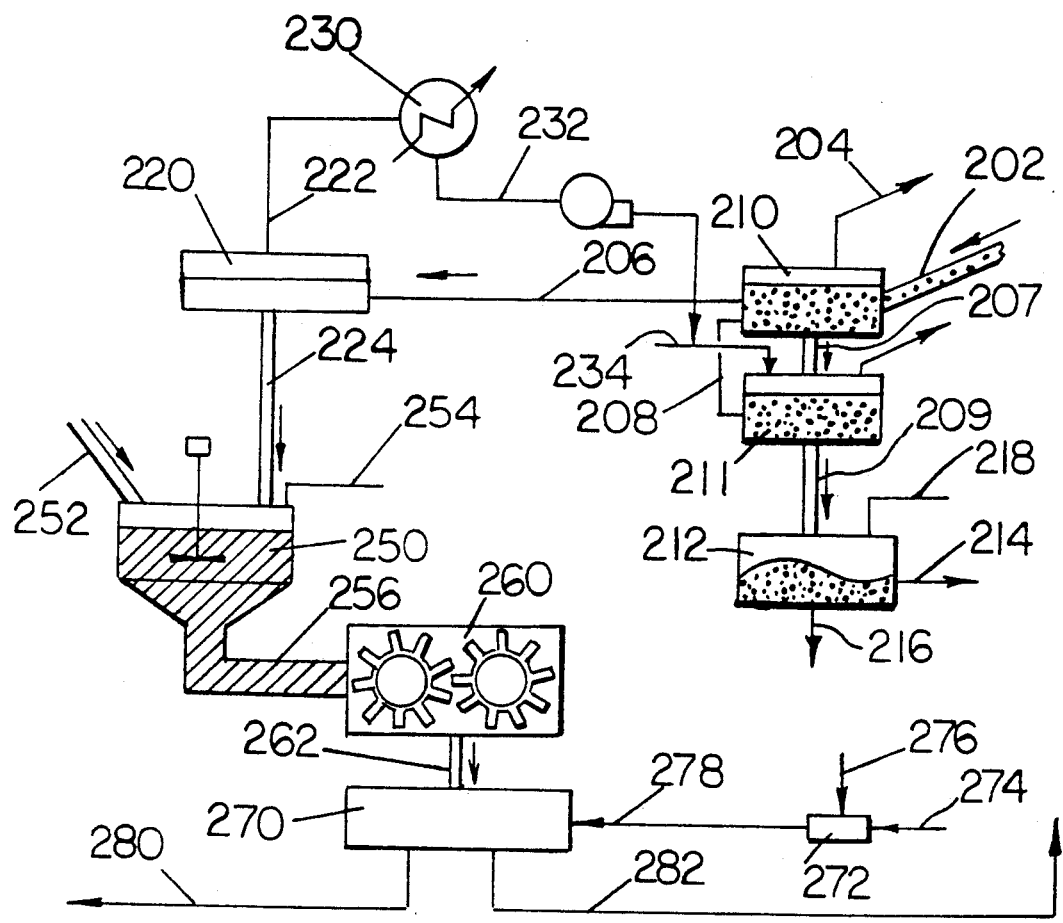
FIG. 4 is a schematic view, showing a plant for refabrication of the sorbent pellets in cooperation with a moving bed desulfurization plant.

Referring to FIG. 4, the refabrication plant can be seen to include sulfuric acid tanks 210 and 211, and a hydrochloric acid tank 212; a drier 220; a condenser 230; a mixer 250; a pellet extruder 260; and a kiln 270.

A small portion of the sulfided pellet (stannous sulfide, SnS) inventory is removed from the absorber (reference numeral 120 in FIG. 2, not shown in FIG. 4) and is introduced into the first sulfuric acid tank 210 by way of inlet 202. It should be understood that inlet 202 draws off a portion of the fractured pellets from the bottom of the absorber, for example, about 10% per cycle.

In tank 210, the stannous sulfide is reacted with sulfuric acid ($H_2SO_4$) to yield a stannous sulfate ($SnSO_4$) and hydrogen sulfide ($H_2S$) according to reaction 6 as previously seen in overview:

$$SnS + H_2SO_4 \rightarrow SnSO_4 + H_2S \quad (6)$$

As can be seen, the stannous sulfide dissolves in the concentrated sulfuric acid (i.e., about 9 M), producing hydrogen sulfide gas which is removed at gas outlet 204, and an aqueous stannous sulfate which is removed at flow outlet 206. There are also unreacted solids in solution which are drawn off at solution outlet 207.

The hydrogen sulfide gas ($H_2S$) is removed from the sulfuric acid tank 210 at gas outlet 204 and is directed to combustion chamber 272 where it is burned as fuel.

The unreacted solids are drawn from the sulfuric acid tank 210 at solution outlet 207 and the solution is directed into a secondary sulfuric acid tank 211. To the extent that reaction 6 is repeated in the secondary sulfuric acid tank 211, the aqueous stannous sulfate solution produced thereby is directed back to the first sulfuric acid tank 210 by way of return system 208. To the extent that unreacted solids remain after this reaction, those solids are drawn out of the secondary sulfuric acid tank 211 at outlet 209, and are passed to a hydrochloric acid tank 212.

In the hydrochloric acid tank 212, additional tin may be recovered from the still-unreacted solids by reaction with hydrochloric acid, forming an aqueous stannous chloride ($SnCl_2$). The stannous chloride solution is drawn out of the tank 212 by outlet system 214, and is sent off-site for recovery of the tin. The remaining solids are drawn off from tank 212 at waste outlet 216 and disposed of. Additional hydrochloric acid is introduced into the tank 212, as needed, at acid inlet 218.

Resuming the discussion with the desired stannous sulfate ($SnSO_4$) solution last seen in sulfuric acid tank 210, the aqueous stannous sulfate is drawn out of tank 210 by outlet system 206. The solution is introduced into a drier 220. The drier 220 evaporates excess water and sulfuric acid from the aqueous stannous sulfate, leaving a stannous sulfate paste ($SnSO_4$).

The sulfuric acid vapors are removed from the drier 220 at outlet 222, and the stannous sulfate paste is removed from the drier 220 at outlet 224.

The sulfuric acid vapors are cooled in a condenser 230 and liquid sulfuric acid is returned to the sulfuric acid tank 211 by acid return system 232. Additional "makeup" sulfuric acid is also added to the acid bath at inlet 234 to maintain acid concentration in the bath so that the solution comprises 100% excess acid.

The stannous sulfate ($SnSO_4$) paste from the drier 220 passes through outlet 224 and into the mixer 250. In the mixer, stannic oxide fines from the regenerator (not separately shown in FIG. 4) are added at inlet 252 and mixed with the stannous sulfate paste. Additional, "makeup" stannous sulfate ($SnSO_4$) is added to the mixer 250 at inlet 254 in an amount sufficient to compensate for the tin lost to the system (as waste, at outlet 216 of the hydrochloric acid tank 12; and for off-site recovery, at outlet 214 of the hydrochloric acid tank).

The mixed stannous sulfate ($SnSO_4$) paste leaves the drier 250 at outlet 256 and enters the pellet extruder 260. The extruder 260 produces "green" unfired pellets of the desired shape and size, having significant quantities of water (10% water by weight). The green pellets leave the extruder 260 at exit 262 and are transported to the kiln 270.

The green pellets are fired in the kiln 270 at about 1,832° F. (1,000° C.) to dry the pellets, to decompose the stannous sulfate ($SnSO_4$) to stannic oxide ($SnO_2$) according to reaction 7 previously discussed in the overview, and to sinter the resulting stannic oxide powder to a durable pellet. The relevant reaction is this:

$$SnSO_4 \rightarrow SnO_2 + SO_2 \qquad (7)$$

Most of the energy for the thermal decomposition of reaction 7 is provided by burning the hydrogen sulfide which is produced in the sulfate formation reaction (reaction 6). This is indicated in FIG. 4 by a combustion chamber 272 which is fueled by a mixture of air introduced to the chamber 272 at inlet 274 and hydrogen sulfide introduced at inlet 276. The hot gases flow through pipes (system 278) as indicated in FIG. 4, into the kiln 270.

Finally, the refabricated stannic oxide pellets are removed from the kiln 270 at outlet system 280 and the pellets are fed back into the absorber (not shown in FIG. 4) for continued use in the desulfurization system of this invention. The mixed exhaust gas products of the kiln 270, including sulfur dioxide ($SO_2$), are removed at outlet 282 and fed back into the regenerator (not shown in FIG. 4) for fuel in the regeneration reaction of the stannous sulfide to stannic oxide (reaction 4).

It can be seen that the net result of reactions 6 and 7 and the intervening processes is the reformation of the desired sorbent, stannic oxide ($SnO_2$), together with two byproducts, hydrogen sulfide ($H_2S$) and sulfur dioxide ($SO_2$). Those by-products are generally undesirable, and would be problematic in another system. But, in the system of this invention, both of those by-products are fuels for desired reactions, and can reinjected into the appropriate reaction chamber and consumed on site.

The refabrication plant has been shown as being on-site, but refabrication may also be carried out off-site. On-site refabrication would use the heat released during regeneration and would save transportation costs; off-site refabrication could collect sorbents from more than one gasifier facility and might operate with significant economies of scale.

As was indicated, the foregoing discussion was directed towards the stannic oxide sorbent, but the process may be used for zinc ferrite, zinc titanate, copper oxides, and manganese oxide base sorbents (e.g., $Cu_2O$, FeO, $Fe_2O_3$, $Fe_3O_4$, $MnO_2$, ZnO, $ZnFe_2O_4$) as well—all have the same type of reaction with sulfuric acid and the other reactants involved. The starting material for the sorbents in the process can be natural minerals or ores.

The process may use recovered or expandable binders in the production of the re-fabricated pellet. The binders can include alumina, silica, and titania. The binders can be recovered in an active form by sodium hydroxide.

As was also indicated, the foregoing discussion was directed at the sulfided starting point (reactions 6 and 7), but the oxided starting point could just as easily have been illustrated. In that case, reactions 8–10 would be performed, using sodium hydroxide to form the sodium stannate, and recovering the stannic oxide by precipitation with carbon dioxide. In light of the description already given, there is no need to further elaborate the other route to refabrication.

Method of Use

Figure 5:
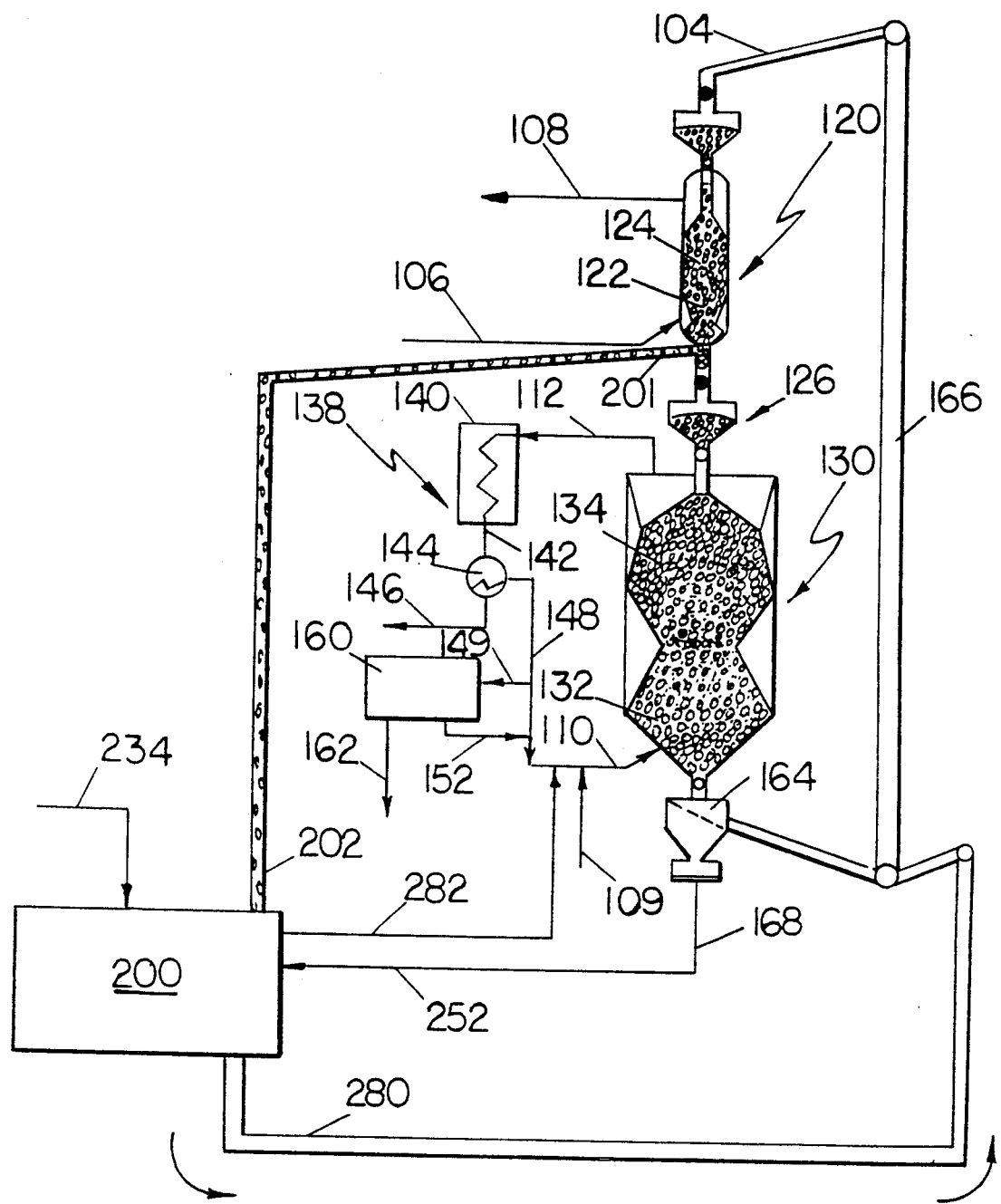
FIG. 5 is a schematic view, showing a complete plant, having a moving bed desulfurization process facility and a pellet refabricating facility.

From the foregoing discussion, the method of this invention should now be apparent. With reference to FIG. 5, which is a schematic drawing showing a moving bed desulfurization plant with an on-site refabrication plant, the method is readily seen.

Sorbent pellets, including stannic oxide and a second sorbent such as zinc ferrite or other metal oxide or mixed metal oxide, are fed into an absorber 120 at pellet inlet 104. The hydrogen sulfide containing-outlet gas stream 106 from a gasifier is fed into the lower portion 122 of the absorber 120.

In the absorber 120, stannic oxide pellets absorb hydrogen sulfide in the lower portion 122 of the absorber, and a second sorbent, such as zinc ferrite, absorbs hydrogen sulfide in the upper portion 124 of the absorber. The cleaned gas, with its hydrogen sulfide concentration lowered to 20 ppm or less, leaves the absorber at outlet 108.

The pellets, now saturated with sulfur, enter the regenerator 130 by way of the pellet injector system 126. In the lower portion 132 of the regenerator 130, air reacts with the sulfided pellets of the second sorbent, such as zinc sulfide (ZnS) and iron sulfide (FeS) to regenerate the zinc ferrite ($ZnFe_2O_4$) sorbent and to yield sulfur dioxide ($SO_2$). In the upper portion 134 of the regenerator 130, the sulfur dioxide reacts with stannous sulfide (SnS) to regenerate stannic oxide ($SnO_2$) and to yield elemental sulfur in the gaseous state.

The elemental sulfur, in gaseous phase, is carried out of the regenerator 130 by outlet system 112, passed through a heat exchanger 140 and condenser 144, and recovered as liquid sulfur at outlet 146.

The outlet gases also pass out of the regenerator 130 at outlet 112, pass through the heat exchanger, and then travel through connecting system 148 and is recycled into the regenerator 130 through inlet 110, mixing with air entering the regenerator at inlet 108. Other outlet gases are diverted by connecting system 148 into tail gas treatment plant 160 at inlet 149, treated gases are vented at outlet 162, and sulfur dioxide-containing gases are fed back into the regenerator 130 through outlet 152. The cooled recirculating sulfur dioxide-containing gases tend to cool the regenerator 130 and also provide a consumable sulfur dioxide fuel for the stannic oxide regeneration reaction (reaction 4).

Regenerated pellets are removed from the regenerator 130 at outlet 164, and the elevator 166 transports them back around to the pellet inlet 104 of the absorber 120 for additional cycles. Fines are removed downstream of the outlet 164 at removal outlet 168.

The relevant chemical reactions that occur during the desulfurization process just described are these:

$$3\ H_2S + 3\ H_2 + 3\ SnO_2 \rightarrow 3\ SnS + 6\ H_2O \qquad (1)$$

$$3\ H_2S + H_2 + AnFe_2O_4 \rightarrow ZnS + 2\ FeS + 4\ H_2O \qquad (2)$$

$$ZnS + 2\ FeS + 5\ O_2 \rightarrow ZnFe_2O_4 + 3\ SO_2 \qquad (3)$$

$$3\ SnS + 3\ SO_2 \rightarrow 3\ SnO_2 + 3\ S_2\ (\text{or}\ \tfrac{3}{8}\ S_8) \qquad (4)$$

and the net chemical reaction of the desulfurization system is this:

$$6\ H_2S + 4\ H_2 + 5\ O_2 \rightarrow 3\ S_2 + 10\ H_2O \qquad (5)$$

High surface area sorbent pellets are refabricated in a refabrication plant 200 whose components have been described in connection with FIG. 4. It can be seen that a small portion of the sulfided pellet inventory is removed from the absorber 120 at outlet 201, and is fed into the refabrication plant 200 at inlet 202.

Fines are removed at the bottom of the regenerator 130 at outlet 168, and are fed into the refabrication plant 200 at inlet 252. Sulfuric acid is introduced into the refabrication plant at acid inlet 234.

After processing in the refabrication plant 200 (as previously described in detail), refabricated pellets are produced. The pellets are removed at outlet system 280 and are fed back into the absorber 120 for continued use in the desulfurization system.

The relevant reactions which occur in the refabrication plant 200 are these:

$$SnS + H_2SO_4 \rightarrow SnSO_4 + H_2S \quad (6)$$

$$SnSO_4 \rightarrow SnO_2 + SO_2 \quad (7)$$

By appropriate adjustment, the following reactions may also be set up to occur in a refabricating plant, starting with the stannic oxide product:

$$SnO_2 + 2 NaOH + 2 H_2O \rightarrow Na_2Sn(OH)_6 \quad (8)$$

$$Na_2Sn(OH)_6 + CO_2 \rightarrow Sn(OH)_4 + Na_2CO_3 \quad (9)$$

$$Sn(OH)_4 \rightarrow SnO_2 + 2 H_2O \quad (10)$$

Another refabrication method reduces the oxide to the metallic tin. At very high temperatures (e.g., 816° C., 1500° F.) hydrogen will react with the stannic oxide and produce molten metallic tin by the following reaction:

$$SnO_2 + 2 H_2 \rightarrow Sn + 2 H_2O \quad (11)$$

Gravity separates the high density molten tin from any other oxides present. A high surface area $SnO_2$ is then reformed as a powder by simple oxidation of the metallic tin in air. The oxide is then formed into pellets in a pellet press or extruder in the same manner as in the other methods, previously described, of recovering the tin from the spent sorbent.

In summary, it can now be understood that this invention provides an efficient high temperature desulfurization process that will remove as much as 99.8% of the hydrogen sulfide contaminants of the coal gasification stream. The system of this invention uses regenerable sorbents. The system of this invention also consumes unwanted by-products of the absorption/regeneration reactions so as to minimize the need for separate recovery and disposal of such by-products. The system of this invention also recovers elemental sulfur in a useable form for resale.

It should also be understood that this invention provides a process for refabricating a short-lived pellet suitable for use in the system of this invention. Accordingly, this invention includes a method for the inexpensive recovery and reuse of the tin (or other metal species) from the degraded sorbent pellets used in the system of this invention. The refabrication method of this invention involves the periodic removal of degraded pellets, the chemical recovery of the metal species from the degraded pellet, and the refabrication of the high surface area tin oxide (or other metal oxide) in a new pellet.

The specific examples given are by way of illustration only, and not by way of limitation.

What is claimed is:

1. A system for high temperature desulfurization of sulfur-containing gases by regenerable sorbents, comprising:
   (a) a reaction vessel;
   (b) a reactant mixture contained within said reaction vessel, said reactant mixture including a regenerable first sorbent and a regenerable second sorbent; wherein said regenerable first sorbent is stannic oxide (tin oxide, $SnO_2$) and said regenerable second sorbent is a material selected from the group consisting of $Cu_2O$, $FeO$, $Fe_2O_3$, $Fe_3O_4$, $MnO_2$, $ZnO$, $ZnFe_2O_4$, and mixtures of these in any proportion;
   (c) means for introducing sulfur-containing gases at a high temperature to said reaction vessel, said reactant mixture thereby absorbing sulfur from said sulfur-containing gases and forming a first sulfide from said regenerable first sorbent and forming a second sulfide from said regenerable second sorbent;
   (d) means for introducing air or oxygen at a high temperature to said reaction vessel thereby producing sulfur dioxide and regenerating said regenerable second sorbent; and thereby concentrating said sulfur dioxide within said reaction vessel, producing elemental sulfur and regenerating said regenerable first sorbent; and
   (e) refabricating means in operative communication with said reaction vessel, said refabricating means including means for withdrawing a portion of at least one of said regenerable first sorbent and regenerable second sorbent and means for reacting said portion with a base for refabricating at least one of said regenerable first sorbent and regenerable second sorbent.

2. The system of claim, further comprising recovery means in fluid communication with said reaction vessel for recovering said elemental sulfur.

3. The system of claim 1, wherein said reaction vessel is a fixed bed in which said regenerable first sorbent and said regenerable second sorbent are disposed, said sorbents being mixed together.

4. The system of claim 1, wherein said reaction vessel is a moving bed in which said regenerable first sorbent and said regenerable second sorbent are disposed, said sorbents being mixed together.

5. The system of claim 1, wherein said means for introducing sulfur-containing gases includes a first gas inlet means for introducing sulfur-containing hot gases into said reaction vessel;
   wherein said means for introducing air or oxygen includes a second gas inlet means for introducing air or oxygen into said reaction vessel.

6. The system of claim 5, wherein said reaction vessel is a fixed bed system.

7. The system of claim 5, wherein said reaction vessel is a moving bed system.

8. The system of claim 5, wherein said reaction vessel is a fluidized bed system.

9. A system for high temperature desulfurization of sulfur-containing gases by regenerable sorbents, comprising:
   (a) a reaction vessel;
   (b) a reactant mixture contained within said reaction vessel, said reactant mixture including a regenerable first sorbent and a regenerable second sorbent; wherein said regenerable first sorbent is stannic oxide (tin oxide, $SnO_2$) and said regenerable second sorbent is a material selected from the group consisting of $Cu_2O$, FeO, $Fe_2O_3$, $Fe_3O_4$, $MnO_2$, ZnO, $ZnFe_2O_4$ and mixtures of these in any proportion;

(c) means for introducing sulfur-containing gases at a high temperature to said reaction vessel, said reactant mixture thereby absorbing sulfur from said sulfur-containing gases and forming a first sulfide from said regenerable first sorbent and forming a second sulfide from said regenerable second sorbent;

(d) means for introducing air or oxygen at a high temperature to said reaction vessel thereby producing sulfur dioxide and regenerating said regenerable second sorbent; and thereby concentrating said sulfur dioxide within said reaction vessel, producing elemental sulfur and regenerating said regenerable first sorbent; and (e) refabricating means in operative communication with said reaction vessel, said refabricating means including means for withdrawing a portion of at least one of said first sulfide and second sulfide and means for reacting said portion with an acid thereby producing a meal sulfate for refabricating at least one of said regenerable first sorbent and regenerable second sorbent, wherein said refabricating means further comprises means for heating said metal sulfate to a molten metal for refabricating at least one of said regenerable first sorbent and regenerable second sorbent in a high surface area form by gravity separation of said molten metal followed by oxidation of said molten metal to a high surface area form.

10. The system of claim 8, wherein said portion withdrawn from the reaction vessel is a portion of the first sulfide and wherein said reaction with the acid produces a byproduct including tin compounds, and further comprising: means for reacting a natural mineral form of tin oxide or tin sulfide with said byproduct, thereby recovering elemental tin from said byproduct, wherein said natural mineral form of tin oxide or tin sulfide is a material selected from the group consisting of $SnCl_2$, $SnSO_4$, $SnO_2$, $Na_2SnO_3$, and mixture of these in any proportion.

* * * * *